US012744387B2

(12) United States Patent
Lai et al.

(10) Patent No.: US 12,744,387 B2
(45) **Date of Patent: *Sep. 22, 2026**

(54) ENERGY STORAGE SYSTEM AND OPERATING METHOD THEREOF

(71) Applicant: Delta Electronics, Inc., Taoyuan City (TW)

(72) Inventors: Chao-Yuan Lai, Taoyuan City (TW); Zhe-Hao Chang, Taoyuan City (TW); Yi-Kuan Ke, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 19/020,272

(22) Filed: Jan. 14, 2025

(65) Prior Publication Data

US 2025/0253666 A1 Aug. 7, 2025

Related U.S. Application Data

(60) Provisional application No. 63/627,889, filed on Feb. 1, 2024.

(30) Foreign Application Priority Data

Oct. 30, 2024 (CN) ......................... 202411530464.3

(51) Int. Cl.
*H02J 3/24* (2006.01)
*H02J 3/0014* (2026.01)
(Continued)

(52) U.S. Cl.
CPC ............ *H02J 3/32* (2013.01); *H02J 3/00142* (2026.01); *H02J 7/82* (2026.01); *H02J 7/933* (2026.01)

(58) Field of Classification Search
CPC ...... H02J 7/06; H02J 3/241; H02J 3/28; H02J 3/381; H02J 3/32; H02J 2300/24;
(Continued)

(56) References Cited

U.S. PATENT DOCUMENTS

| | | | |
|---|---|---|---|
| 10,199,988 | B2 | 2/2019 | An et al. |
| 2015/0214754 | A1 | 7/2015 | Choi et al. |

(Continued)

FOREIGN PATENT DOCUMENTS

| | | | |
|---|---|---|---|
| CN | 101499676 | A | 8/2009 |
| CN | 102891495 | A | 1/2013 |

(Continued)

OTHER PUBLICATIONS

Kübra Nur Akpinar, Optimum Battery State of Charge Control for Frequency Response Service, 2022, 10th IEEE International Conference on Smart Grid, Jun. 27-29, 2022, Istanbul, Turkey pp. 255-260 (Year: 2022).*

*Primary Examiner* — Elim Ortiz
(74) *Attorney, Agent, or Firm* — KIRTON McCONKIE; Evan R. Witt

(57) ABSTRACT

An energy storage system and an operating method thereof are provided. The energy storage system provides power regulation for the power grid. The energy storage system includes an energy storage unit, a measurement unit and a control unit. The measurement unit measures the operating frequency of the power grid, and the control unit receives the operating frequency measured by the measurement unit. When the operating frequency is greater than or equal to a first frequency boundary value and less than or equal to a second frequency boundary value, the control unit configures the regulation ratio of the power regulation to be a first operating ratio which is less than or equal to 0 and greater than or equal to the first input boundary value. The first frequency boundary value is less than the first frequency,
(Continued)

and/or the second frequency boundary value is greater than the second frequency.

18 Claims, 16 Drawing Sheets

(51) Int. Cl.

| | |
|---|---|
| ***H02J 3/32*** | (2006.01) |
| ***H02J 7/06*** | (2006.01) |
| ***H02J 7/82*** | (2026.01) |
| ***H02J 7/90*** | (2026.01) |

(58) Field of Classification Search

CPC ...... H02J 2300/28; H02J 2300/20; H02J 3/46; H02J 7/35; Y02E 10/56; Y02E 70/30

USPC ...... 307/46, 18, 19, 84, 66, 64, 52; 700/297, 700/291, 286, 295, 287; 320/109, 128, 320/134, 162; 290/44

See application file for complete search history.

(56) References Cited

U.S. PATENT DOCUMENTS

| | | | |
|---|---|---|---|
| 2016/0079755 | A1 | 3/2016 | Triebel et al. |
| 2016/0233689 | A1 | 8/2016 | Shim |
| 2016/0268802 | A1 | 9/2016 | Shim |
| 2020/0176999 | A1 | 6/2020 | Rastegar et al. |
| 2021/0288514 | A1 | 9/2021 | Wen et al. |
| 2022/0131385 | A1 | 4/2022 | Shang et al. |

FOREIGN PATENT DOCUMENTS

| | | | |
|---|---|---|---|
| CN | 104065095 | A | 9/2014 |
| CN | 107069789 | A | 8/2017 |
| CN | 108365621 | A | 8/2018 |
| CN | 109586319 | A | 4/2019 |
| CN | 109861242 | A | 6/2019 |
| CN | 110571871 | A | 12/2019 |
| CN | 112636374 | A | 4/2021 |
| CN | 113937797 | A | 1/2022 |
| CN | 115986960 | A | 4/2023 |
| CN | 116094002 | A | 5/2023 |
| CN | 116667387 | A | 8/2023 |
| CN | 117277449 | A | 12/2023 |
| CN | 117277958 | A | 12/2023 |
| CN | 117293880 | A | 12/2023 |
| CN | 117293881 | A | 12/2023 |
| CN | 117318105 | A | 12/2023 |
| CN | 117353337 | A | 1/2024 |
| CN | 117955137 | A | 4/2024 |
| KR | 101477648 | B1 | 12/2014 |
| TW | 200950249 | A1 | 12/2009 |
| TW | 201117520 | A1 | 5/2011 |
| TW | M416930 | U1 | 11/2011 |
| TW | M550931 | U | 10/2017 |
| TW | 202338677 | A | 10/2023 |
| WO | 2022246817 | A1 | 12/2022 |
| WO | 2023202753 | A1 | 10/2023 |

* cited by examiner

ENERGY STORAGE SYSTEM AND OPERATING METHOD THEREOF

CROSS-REFERENCE TO RELATED APPLICATION

This application claims the benefit of U.S. Provisional Application No. 63/627,889 filed on Feb. 1, 2024 and entitled "EFFICIENCY OPTIMIZATION IN ENERGY STORAGE SYSTEM". This application also claims priority to China Patent Application No. 202411530464.3 filed on Oct. 30, 2024. The entire contents of the above-mentioned patent applications are incorporated herein by reference for all purposes.

FIELD OF THE INVENTION

The present disclosure relates to an energy storage system and an operating method thereof, and more particularly to an energy storage system and an operating method thereof capable of improving efficiency.

BACKGROUND OF THE INVENTION

In response to the increasing demand for energy and environmental sustainability, renewable energy sources such as wind and solar power become more and more important in power systems, with a rising ratio in power supply. However, the inherent instability of renewable energy source also presents numerous management challenges for conventional power grids. As a result, energy storage systems that can enhance reliability, resilience and flexibility are applied to the power grid more frequently. An energy storage system may include a battery system (e.g., energy conversion device such as fuel cells and lithium batteries) and an energy management system, and provides functions like voltage regulation and frequency regulation.

Due to the instability of renewable energy source and the variations in power generation structure and power demand in power systems, the electric utility has developed a series of auxiliary services and established corresponding market rules to enhance the stability and resilience of power grid. For example, the auxiliary services include frequency regulation, voltage regulation, demand response, and black start services. Each of these services has specific rules that govern the energy storage response. However, directly regulating the energy storage according to said rules may result in poor system performance. Additionally, during the operation, factors such as the configuration of the energy storage system, power topology, surrounding environment conditions (e.g., temperature and humidity), and grid scenarios may lead to inefficient operation of the energy storage system or cause excessive loss, which may shorten its lifespan. Therefore, there is need of integrating energy storage systems from multiple perspectives to ensure operation at the optimal operating point. Such integration would enable the effective use of field structures, improvement or adjustment of energy storage efficiency curves, and extension of battery lifespan.

SUMMARY OF THE INVENTION

The present disclosure provides an energy storage system and an operating method thereof to overcome the drawbacks of conventional technologies.

In accordance with an aspect of the present disclosure, an energy storage system is provided. The energy storage system is configured to provide power regulation for a power grid with a maximum value of the power regulation being a contracted capacity. When an operating frequency of the power grid is greater than or equal to a first frequency and less than or equal to a second frequency, a regulation ratio of the power regulation of the energy storage system is greater than or equal to a first input boundary value and less than or equal to a first output boundary value. When the operating frequency of the power grid is greater than or equal to a third frequency and less than or equal to the first frequency, the regulation ratio of the power regulation of the energy storage system is greater than or equal to the first input boundary value and less than or equal to a second output boundary value. When the operating frequency decreases from the first frequency to the third frequency, a plurality of first upper limits of the regulation ratio, which correspond to a plurality of first operating frequencies decreasing from the first frequency to the third frequency, increase from the first output boundary value to the second output boundary value correspondingly, and a plurality of first lower limits of the regulation ratio, which correspond to the plurality of first operating frequencies decreasing from the first frequency to the third frequency, increase from the first input boundary value to the second output boundary value correspondingly. When the operating frequency of the power grid is greater than or equal to the second frequency and less than or equal to a fourth frequency, the regulation ratio of the power regulation of the energy storage system is greater than or equal to a second input boundary value and less than or equal to the first output boundary value. When the operating frequency increases from the second frequency to the fourth frequency, a plurality of second upper limits of the regulation ratio, which correspond to a plurality of second operating frequencies increasing from the second frequency to the fourth frequency, decrease from the first output boundary value to the second input boundary value correspondingly, and a plurality of second lower limits of the regulation ratio, which correspond to the plurality of second operating frequencies increasing from the second frequency to the fourth frequency, decrease from the first input boundary value to the second input boundary value correspondingly. The energy storage system includes an energy storage unit, a measurement unit and a control unit. The energy storage unit is configured to store and provide power, the measurement unit is configured to measure the operating frequency of the power grid, and the control unit is coupled to the measurement unit and the energy storage unit and is configured to receive the operating frequency of the power grid measured by the measurement unit. When a state of charge of the energy storage unit is greater than a first charge level, the energy storage unit is in a normal charge state. When the state of charge of the energy storage unit is less than the first charge level, the energy storage unit is in a low charge state. When the control unit configures the regulation ratio of the power regulation of the energy storage system to be greater than 0, the control unit configures the energy storage unit to supply the power to the power grid with the regulation ratio of the contracted capacity. When the control unit configures the regulation ratio of the power regulation of the energy storage system to be less than 0, the control unit configures the energy storage unit to be charged by the power grid with the regulation ratio of the contracted capacity. When the operating frequency of the power grid measured by the measurement unit is greater than or equal to a first frequency boundary value and less than or equal to a second frequency boundary value, the control unit configures the regulation ratio of the power regulation to be a first operating ratio, and the first operating ratio is less than or equal to 0 and greater than or equal to the first input boundary value. The first frequency boundary value is less than the first frequency, and/or the second frequency boundary value is greater than the second frequency.

In accordance with another aspect of the present disclosure, an operating method of an energy storage system is provided. The energy storage system is configured to provide power regulation for a power grid with a maximum value of the power regulation being a contracted capacity. When an operating frequency of the power grid is greater than or equal to a first frequency and less than or equal to a second frequency, a regulation ratio of the power regulation of the energy storage system is greater than or equal to a first input boundary value and less than or equal to a first output boundary value. When the operating frequency of the power grid is greater than or equal to a third frequency and less than or equal to the first frequency, the regulation ratio of the power regulation of the energy storage system is greater than or equal to the first input boundary value and less than or equal to a second output boundary value. When the operating frequency decreases from the first frequency to the third frequency, a plurality of first upper limits of the regulation ratio, which correspond to a plurality of first operating frequencies decreasing from the first frequency to the third frequency, increase from the first output boundary value to the second output boundary value correspondingly, and a plurality of first lower limits of the regulation ratio, which correspond to the plurality of first operating frequencies decreasing from the first frequency to the third frequency, increase from the first input boundary value to the second output boundary value correspondingly. When the operating frequency of the power grid is greater than or equal to the second frequency and less than or equal to a fourth frequency, the regulation ratio of the power regulation of the energy storage system is greater than or equal to a second input boundary value and less than or equal to the first output boundary value. When the operating frequency increases from the second frequency to the fourth frequency, a plurality of second upper limits of the regulation ratio, which correspond to a plurality of second operating frequencies increasing from the second frequency to the fourth frequency, decrease from the first output boundary value to the second input boundary value correspondingly, and a plurality of second lower limits of the regulation ratio, which correspond to the plurality of second operating frequencies increasing from the second frequency to the fourth frequency, decrease from the first input boundary value to the second input boundary value correspondingly. The energy storage system includes an energy storage unit, a measurement unit and a control unit. The energy storage unit is configured to store and provide power, the measurement unit is configured to measure the operating frequency of the power grid, and the control unit is coupled to the measurement unit and the energy storage unit and is configured to receive the operating frequency of the power grid measured by the measurement unit. When a state of charge of the energy storage unit is greater than a first charge level, the energy storage unit is in a normal charge state. When the state of charge of the energy storage unit is less than the first charge level, the energy storage unit is in a low charge state. When the control unit configures the regulation ratio of the power regulation of the energy storage system to be greater than 0, the control unit configures the energy storage unit to supply the power to the power grid with the regulation ratio of the contracted capacity. When the control unit configures the regulation ratio of the power regulation of the energy storage system to be less than 0, the control unit configures the energy storage unit to be charged by the power grid with the regulation ratio of the contracted capacity. The operating method includes: when the operating frequency of the power grid measured by the measurement unit is greater than or equal to a first frequency boundary value and less than or equal to a second frequency boundary value, configuring the control unit to configure the regulation ratio of the power regulation to be a first operating ratio. The first operating ratio is less than or equal to 0 and greater than or equal to the first input boundary value. The first frequency boundary value is less than the first frequency, and/or the second frequency boundary value is greater than the second frequency.

The above embodiments enhance the performance of the energy storage system and optimize the regulation of the battery of energy storage system to maximize the battery lifespan, thereby improving energy efficiency and reducing energy loss.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only.

Figure 1:
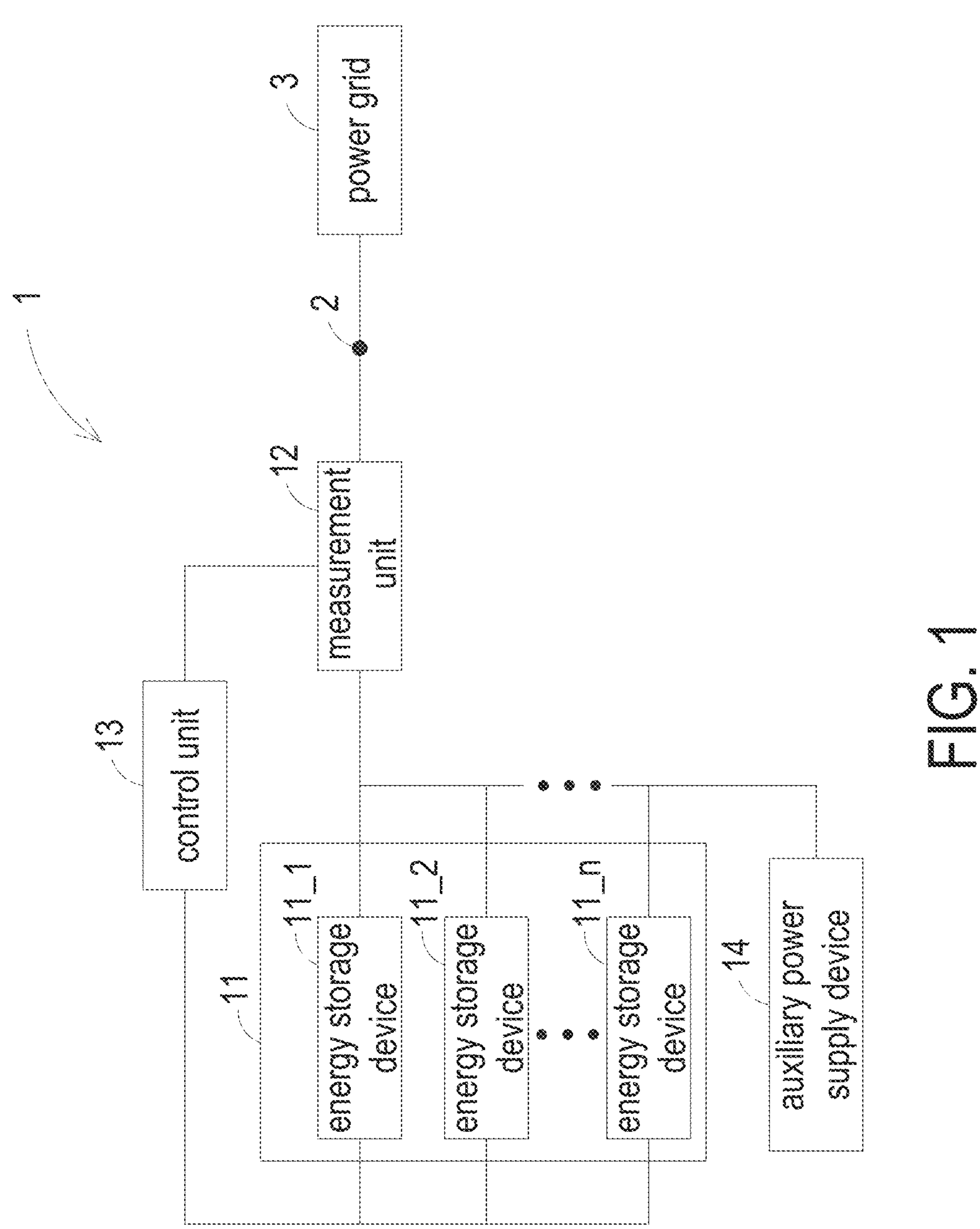
FIG. 1 is a schematic bock diagram illustrating an energy storage system according to an embodiment of the present disclosure.

FIG. 1 is a schematic bock diagram illustrating an energy storage system according to an embodiment of the present disclosure. As shown in FIG. 1, an energy storage system 1 is coupled to a power grid 3 through a grid connection point 2 and provides power regulation for the power grid 3. A maximum value of the power regulation provided by the energy storage system 1 is a contracted capacity. For example, the contracted capacity of the energy storage system 1 may be set to be the awarded capacity or the volume accepted agreed between the electric power company and the regulation service provider. In this embodiment, the energy storage system 1 includes an energy storage unit 11, a measurement unit 12, a control unit 13, and an auxiliary power supply device 14. The energy storage unit 11, the measurement unit 12, and the auxiliary power supply device 14 are respectively coupled to the grid connection point 2, and the control unit 13 is coupled to the energy storage unit 11 and the measurement unit 12. For the sake of brevity, other components of the energy storage system 1 are not depicted in FIG. 1. In this embodiment, the energy storage system 1 is divided into the energy storage unit 11, the measurement unit 12, the control unit 13, and the auxiliary power supply device 14 for clearly describing the operation of the energy storage system 1. Each component of the energy storage system 1 may be configured in suitable quantities, such as one or more auxiliary power supply devices. In addition, the above-mentioned units may be implemented by suitable components respectively, or the above-mentioned units may be integrated into or separately implemented by one or more components. For example, the functions of the measurement unit 12 and control unit 13 may be performed by the same circuit formed by discrete components and/or integrated circuit components.

The measurement unit 12 may adopt an electric meter or other suitable measurement device. The measurement unit 12 may obtain operation information of the power grid 3, such as voltage, frequency and power, by measuring the electrical parameters at the grid connection point 2 or other suitable locations, either through direct or indirect coupling. The control unit 13 may include logic circuitries and is used to control the operation of the energy storage unit 11. For example, the control unit 13 receives the operation information of the power grid 3, such as operating frequency and/or voltage, measured by the measurement unit 12 and obtains the state of charge of the energy storage unit 11. According to the operation information like operating frequency and/or voltage of the power grid 3 and the state of charge of the energy storage unit 11, the control unit 13 controls the energy storage unit 11 to supply power to or receive power from the power grid 3, thereby realizing the power regulation for the power grid 3. The auxiliary power supply device 14 may adopt suitable power conversion structure to provide the required auxiliary voltage, and the auxiliary voltage is used to supply power for internal components within the energy storage system 1, such as cooling systems, communication devices, fire safety equipments, and sensors.

In the embodiment shown in FIG. 1, the energy storage unit 11 of the energy storage system 1 includes a plurality of energy storage devices 11_1, 11_2, . . . , **11_*n*. The number of the energy storage units 11 in the energy storage system 1 is not limited, and each energy storage unit 11** may be configured to include one or more energy storage devices.

Figure 2:
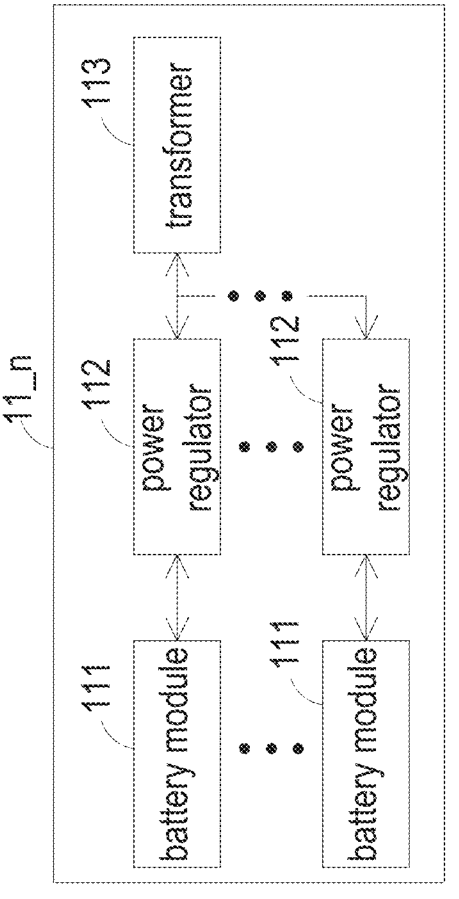
FIG. 2 schematically shows an embodiment of the energy storage device of FIG. 1.

The energy storage device may adopt suitable structure to provide energy storage function. FIG. 2 schematically shows a possible implementation of the energy storage device **11_*n* of FIG. 1. In the implementation shown in FIG. 2, the energy storage device 11_*n* includes a plurality of battery modules 111, a plurality of power regulators 112, and a transformer 113. The plurality of battery modules 111 are electrically connected to the plurality of power regulators 112 respectively, the plurality of power regulators 112 are electrically connected to the transformer 113 respectively, and the transformer 113 is electrically connected to the grid connection point 2. The battery module 111 may be implemented by lithium batteries, solid-state batteries, fuel cells, or thermal batteries. In an embodiment, the battery module 111 further includes a DC-DC converter (direct current to direct current converter). The DC-DC converter converts the power provided by the energy storage battery to a suitable voltage for the power regulator 112, or converts the power received from the power regulator 112 to a suitable voltage for storage in the battery module 111, thereby ensuring voltage stability. The power regulator 112 is used for bidirectional energy conversion and may adopt a bidirectional DC/AC converter. The transformer 113 is used for AC transmission and voltage regulation and may be configured with or without isolation function. In the implementation shown in FIG. 2, the transformer 113 may adopt a multi-winding transformer with multiple windings on the side connected to the plurality of power regulators 112. In another embodiment, the energy storage device 11_*n* includes a plurality of transformers. In further another embodiment, the energy storage device includes one battery module 111, one power regulator 112**, and one transformer 113 electrically connected to each other, and the transformer 113 is electrically connected to the grid connection point 2. In yet another embodiment, the energy storage device includes a battery module 111 and a power regulator 112 electrically connected to each other, and the power regulator 112 is directly connected with the grid connection point 2 to provide power to the power grid 3 or to receive power from the power grid 3 without a transformer.

Figure 3:
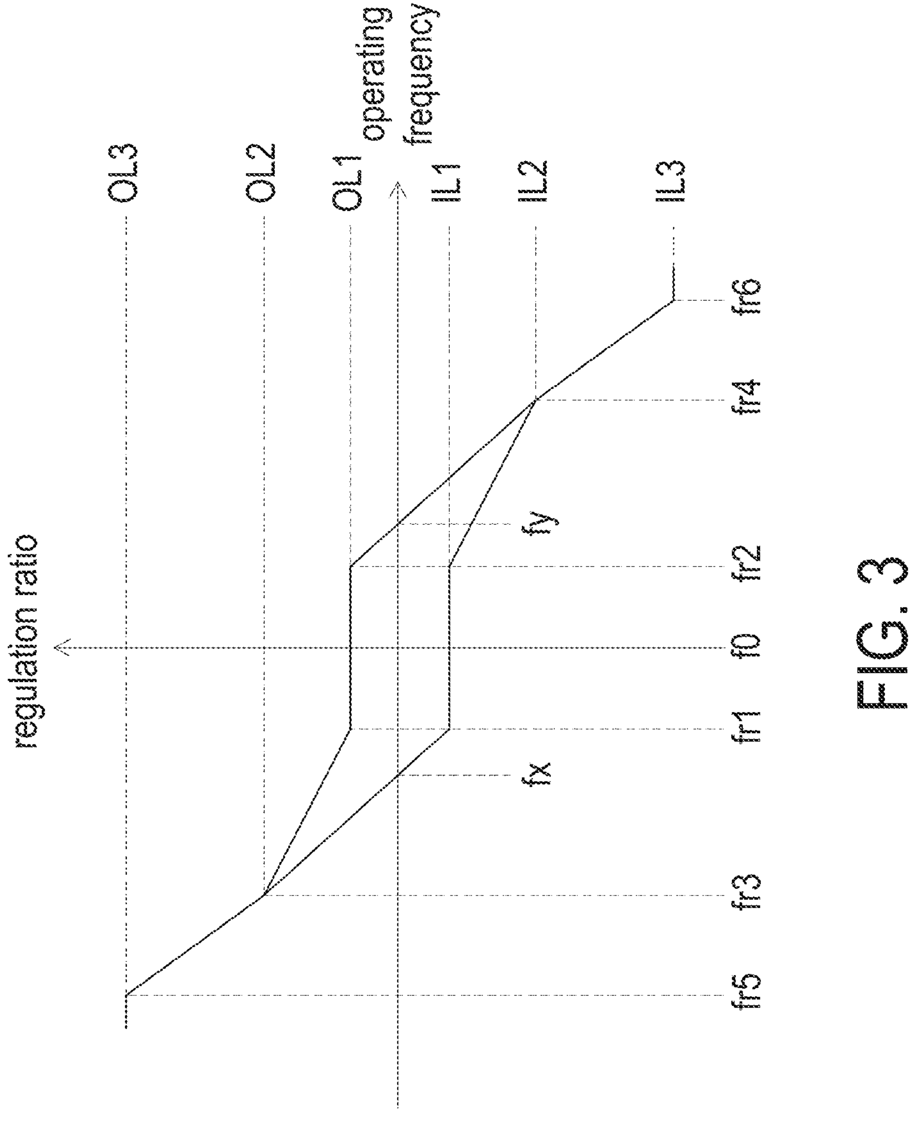
FIG. 3 is a schematic diagram showing a reference relation between a regulation ratio of the power regulation provided by the energy storage system and the operating frequency of the power grid.

Different regions or different electric utilities may have different specifications for grid auxiliary services. Please refer to the embodiment shown in FIG. 3. FIG. 3 is a schematic diagram showing a reference relation between a regulation ratio of the power regulation provided by the energy storage system 1 and the operating frequency of the power grid 3, and this diagram shows upper and lower limits of the regulation ratio of the power regulation provided by the energy storage system 1 corresponding to different operating frequencies of the power grid 3. The regulation ratio of the power regulation provided by the energy storage system 1 is controlled by the control unit 13 of the energy storage system 1, and the maximum value of the power regulation is a contracted capacity (e.g., a power regulation capacity of 10 MW as agreed with the electric utility). When the control unit 13 configures the regulation ratio of the power regulation of the energy storage system 1 to be greater than 0 (i.e., greater than 0 and less than or equal to 100%), the control unit 13 configures the energy storage unit 11 to supply power to the power grid 3 with the regulation ratio of the contracted capacity. When the control unit 13 configures the regulation ratio of the power regulation of the energy storage system 1 to be less than 0 (i.e., less than 0 and greater than or equal to −100%), the control unit 13 configures the energy storage unit 11 to be charged by the power grid 3 with an absolute value of the regulation ratio of the contracted capacity. For the sake of simplicity, the following paragraphs would simplify the "absolute value of regulation ratio" to just the "regulation ratio" (i.e., omitting the "absolute value") when referring to the energy storage unit 11 being charged by the power grid 3. Additionally, it is noted that the curve in FIG. 3 is formed by connecting multiple discrete reference points, and each reference point represents an upper limit and/or a lower limit of the regulation ratio corresponding to an operating frequency.

To comply with the power regulation specifications shown in FIG. 3, when the operating frequency of the power grid 3 is greater than or equal to a first frequency fr1 and less than or equal to a second frequency fr2, the regulation ratio of the power regulation of the energy storage system 1 should be set to be greater than or equal to a first input boundary value IL1 and less than or equal to a first output boundary value OL1. In FIG. 3, f0 may represent a predetermined supply frequency of the power grid 3, such as 50 Hz or 60 Hz.

When the operating frequency of the power grid 3 is greater than or equal to a third frequency fr3 and less than or equal to the first frequency fr1, the regulation ratio of the power regulation of the energy storage system 1 should be set to be greater than or equal to the first input boundary value IL1 and less than or equal to a second output boundary value OL2. When the operating frequency decreases from the first frequency fr1 to the third frequency fr3, a plurality of first upper limits of the regulation ratio, which correspond to the variation of the operating frequency, increase from the first output boundary value OL1 to the second output boundary value OL2 correspondingly, and a plurality of first lower limits of the regulation ratio, which correspond to the variation of the operating frequency, increase from the first input boundary value IL1 to the second output boundary value OL2 correspondingly.

When the operating frequency of the power grid 3 is greater than or equal to the second frequency fr2 and less than or equal to a fourth frequency fr4, the regulation ratio of the power regulation of the energy storage system 1 should be set to be greater than or equal to a second input boundary value IL2 and less than or equal to the first output boundary value OL1. When the operating frequency increases from the second frequency fr2 to the fourth frequency fr4, a plurality of second upper limits of the regulation ratio, which correspond to the variation of the operating frequency, decrease from the first output boundary value OL1 to the second input boundary value IL2 correspondingly, and a plurality of second lower limits of the regulation ratio, which correspond to the variation of the operating frequency, decrease from the first input boundary value IL1 to the second input boundary value IL2 correspondingly.

When the operating frequency of the power grid 3 is greater than or equal to a fifth frequency fr5 and less than or equal to the third frequency fr3, the regulation ratio of the power regulation of the energy storage system 1 should be set to be greater than or equal to the second output boundary value OL2 and less than or equal to a third output boundary value OL3. When the operating frequency decreases from the third frequency fr3 to the fifth frequency fr5, the regulation ratio, which corresponds to the variation of the operating frequency, increases from the second output boundary value OL2 to the third output boundary value OL3 correspondingly. When the operating frequency of the power grid 3 is less than the fifth frequency fr5, the regulation ratio of the power regulation of the energy storage system 1 should be set to equal the third output boundary value OL3.

When the operating frequency of the power grid 3 is greater than or equal to the fourth frequency fr4 and less than or equal to a sixth frequency fr6, the regulation ratio of the power regulation of the energy storage system 1 should be set to be greater than or equal to a third input boundary value IL3 and less than or equal to the second input boundary value IL2. When the operating frequency increases from the fourth frequency fr4 to the sixth frequency fr6, the regulation ratio, which corresponds to the variation of the operating frequency, decreases from the second input boundary value IL2 to the third input boundary value IL3 correspondingly. When the operating frequency of the power grid 3 is greater than the sixth frequency fr6, the regulation ratio of the power regulation of the energy storage system 1 should be set to equal the third input boundary value IL3.

In the embodiment shown in FIG. 3, the relation of the boundary values is OL3>OL2>OL1>IL1>IL2>IL3, and the relation of the frequencies is fr6>fr4>fr2>f0>fr1>fr3>fr5. It is noted that the specific values of the above-mentioned frequencies, input boundary values and output boundary values depend on the frequency response standards for grid auxiliary services in each region or as set by each electric utility, while the relative magnitude relations between the frequencies and between the input and output boundary values may be similar with those shown in FIG. 3.

During the operation of the energy storage system 1, according to conditions like the state of charge of the energy storage unit 11, the operating frequency of the power grid 3, and the efficiency of the energy storage system 1, the control unit 13 configures the regulation ratio of the power regulation of the energy storage system 1 for enabling the energy storage unit 11 to supply power to the power grid 3 or to be charged by the power grid 3 with the regulation ratio of the contracted capacity. The specific configuring manner is exemplified as follows.

The control unit 13 evaluates the state of charge of the energy storage unit 11. For example, if the state of charge of the energy storage unit 11 is greater than a first charge level, the control unit 13 determines that the energy storage unit 11 is in a normal charge state. If the state of charge of the energy storage unit 11 is lower than the first charge level, the control unit 13 determines that the energy storage unit 11 is in a low charge state. If the state of charge is greater than a second charge level (the second charge level is greater than the first charge level), the control unit 13 determines that the energy storage unit 11 is in a high charge state. The specific values of the first and second charge levels may be determined according to actual requirements. In another embodiment, the energy storage system 1 may be configured to provide the power regulation corresponding to one or more of the said three charge states. For instance, the energy storage system 1 may be configured to provide the power regulation only for the normal charge state and the low charge state, only for the high charge state and the low charge state, or only for the normal charge state and the high charge state. Further, the function of power regulation corresponding to each charge state is provided through the methods illustrated as follows.

Figure 4A:
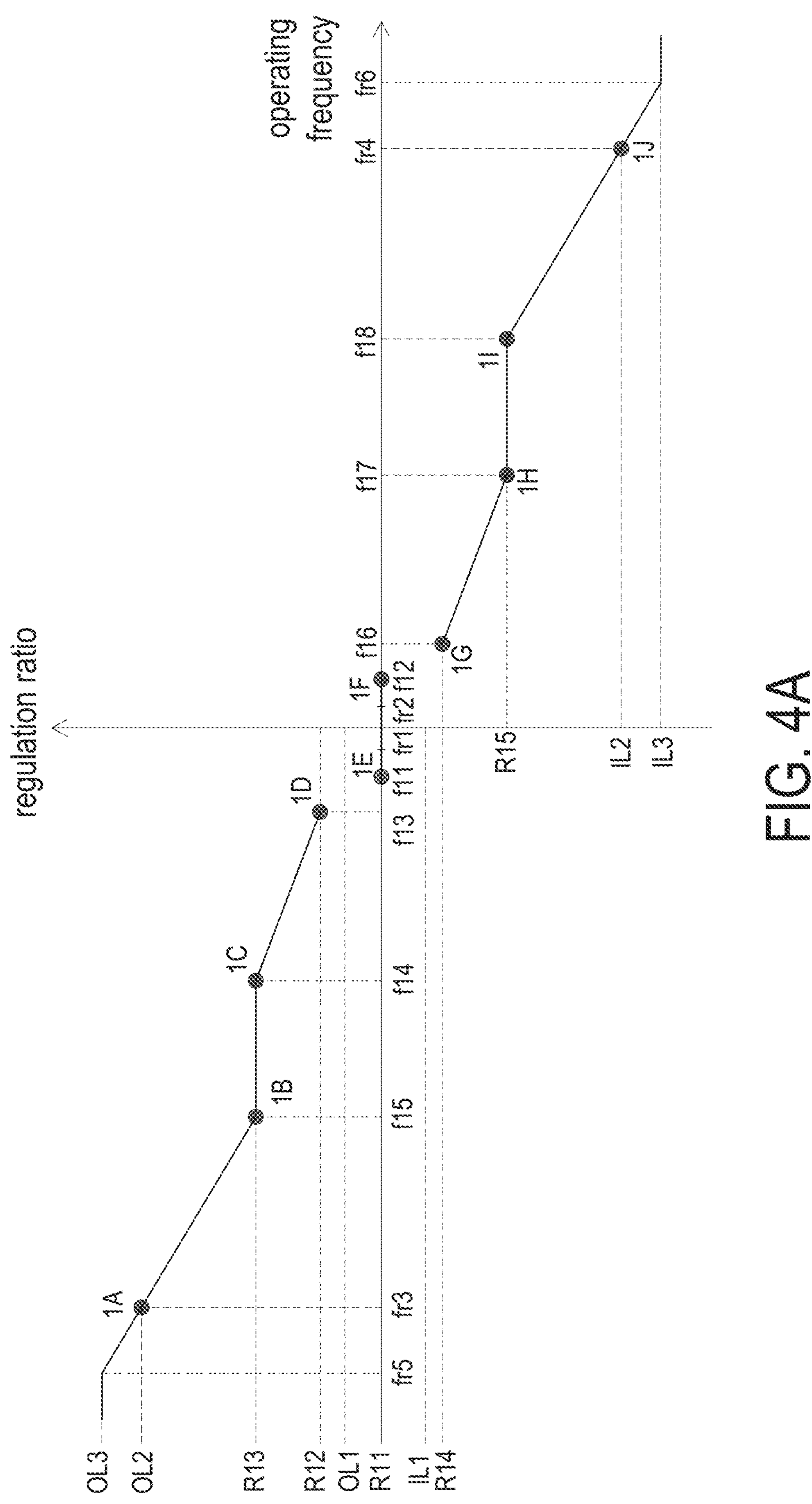
FIG. 4A is a schematic diagram illustrating an embodiment of the regulation ratio of the power regulation provided by the energy storage system corresponding to the operating frequency of the power grid when the energy storage unit is in a normal charge state.

FIG. 4A is a schematic diagram illustrating an embodiment of the regulation ratio of the power regulation provided by the energy storage system 1 corresponding to the operating frequency of the power grid 3 when the energy storage unit 11 is in the normal charge state. The curve in FIG. 4A is formed by connecting multiple discrete operating points, and each operating point represents a regulation ratio corresponding to an operating frequency. Under the circumstance that the energy storage unit 11 is in the normal charge state, as shown in FIG. 4A, when the operating frequency of the power grid 3 measured by the measurement unit 12 is greater than or equal to a first frequency boundary value f11 and less than or equal to a second frequency boundary value f12 (i.e., between the operating points 1E and 1F), the control unit 13 configures the regulation ratio of the power regulation to be a first operating ratio R11, where the first operating ratio R11 is less than or equal to 0 and greater than or equal to the first input boundary value IL1. In addition, the control unit 13 configures the first frequency boundary value f11 to be less than the first frequency fr1, and/or configures the second frequency boundary value f12 to be greater than the second frequency fr2. In other words, in this embodiment, at least one of these two conditions is met. In an embodiment, the control unit 13 configures the first operating ratio R11 to be zero, which means that the energy storage system 1 neither supplies power to the power grid nor receives power from the power grid 3. In another embodiment, the energy storage system 1 includes an auxiliary power supply device 14 (as shown in FIG. 1), and thus the control unit 13 configures the first operating ratio R11 to be less than zero and makes an input power received by the energy storage system 1 from the power grid 3 be greater than or equal to an auxiliary power required by the auxiliary power supply device 14. Thereby, the auxiliary power supply device 14 is substantially powered by the power grid 3 directly. In this frequency range where the power regulation is not required, through setting the first operating ratio R11 to be less than zero, the auxiliary power supply device 14 is directly powered by the power grid 3. This setup does not cause a burden on the power grid 3, and can prevent the energy loss that may occur if the power is first stored in the energy storage unit 11 and then supplied to the auxiliary power supply device 14. Furthermore, the unnecessary charging and discharging cycles are reduced, thereby extending the lifespan of the energy storage unit 11.

When the operating frequency of the power grid 3 measured by the measurement unit 12 is greater than or equal to the third frequency fr3 and less than or equal to a third frequency boundary value f13 (i.e., between the operating points 1A and 1D), the control unit 13 configures the regulation ratio of the power regulation to be less than or equal to the second output boundary value OL2 and greater than or equal to a second operating ratio R12. The third frequency boundary value f13 is greater than the third frequency fr3 and less than the first frequency boundary value f11. The second operating ratio R12 is greater than the first operating ratio R11, and the efficiency of the energy storage system 1 supplying power to the power grid 3 at the second operating ratio R12 is greater than the efficiency of the energy storage system 1 supplying power to the power grid 3 at the first operating ratio R11 by a first efficiency threshold TH1. As shown in FIG. 4A, when the operating frequency of the power grid 3 decreases from the first frequency boundary value f11 to the third frequency boundary value f13, the regulation ratio of the power regulation jumps from the first operating ratio R11 to the second operating ratio R12 correspondingly.

Under the circumstance that the energy storage unit 11 is in the normal charge state, when the operating frequency of the power grid 3 measured by the measurement unit 12 is greater than or equal to a fourth frequency boundary value f14 and less than or equal to the third frequency boundary value f13 (i.e., between the operating points 1C and 1D), the control unit 13 configures the regulation ratio of the power regulation to be substantially equal to (i.e., within an acceptable error range) the first upper limit corresponding to the operating frequency. In addition, the control unit 13 configures the fourth frequency boundary value f14 to be greater than the third frequency fr3 and less than the third frequency boundary value f13. When the operating frequency of the power grid 3 measured by the measurement unit 12 is greater than or equal to a fifth frequency boundary value f15 and less than or equal to the fourth frequency boundary value f14 (i.e., between the operating points 1B and 1C), the control unit 13 configures the regulation ratio of the power regulation to be less than or equal to the first upper limit corresponding to the operating frequency at the fifth frequency boundary value f15 and greater than or equal to the first upper limit corresponding to the operating frequency at the fourth frequency boundary value f14. Further, the control unit 13 configures the regulation ratio of the power regulation to increase or remain constant as the operating frequency decreases (as illustrated in FIG. 4A with an example of remaining constant). Moreover, the control unit 13 configures the fifth frequency boundary value f15 to be greater than the third frequency fr3 and less than the fourth frequency boundary value f14. When the operating frequency of the power grid 3 measured by the measurement unit 12 is greater than or equal to the third frequency fr3 and less than or equal to the fifth frequency boundary value f15 (i.e., between the operating points 1A and 1B), the control unit 13 configures the regulation ratio of the power regulation to increase as the operating frequency decreases. For example, the control unit 13 may configure the regulation ratio of the power regulation to be substantially equal to the first lower limit corresponding to the operating frequency.

When the operating frequency of the power grid 3 measured by the measurement unit 12 is less than or equal to the third frequency fr3, in this embodiment, the electric utility does not permit the energy storage system 1 any adjustment flexibility (see FIG. 3), and thus the relations between the regulation ratio of the power regulation provided by the energy storage system 1 and the operating frequency of the power grid 3 would remain the same as shown in FIG. 3.

In addition, under the circumstance that the energy storage unit 11 is in the normal charge state, when the operating frequency of the power grid 3 measured by the measurement unit 12 is greater than or equal to a sixth frequency boundary value f16 and less than or equal to the fourth frequency fr4 (i.e., between the operating points 1G and 1J), the control unit 13 configures the regulation ratio of the power regulation to be less than or equal to a fourth operating ratio R14 and greater than or equal to the second input boundary value IL2. The sixth frequency boundary value f16 is greater than the second frequency boundary value f12 and less than the fourth frequency fr4. The fourth operating ratio R14 is less than the first operating ratio R11, and the efficiency of charging the energy storage unit 11 by the power grid 3 at the fourth operating ratio R14 is greater than the efficiency of charging the energy storage unit 11 by the power grid 3 at the first operating ratio R11 by a second efficiency threshold TH2. As shown in FIG. 4A, when the operating frequency of the power grid 3 increases from the second frequency boundary value f12 to the sixth frequency boundary value f16, the regulation ratio of the power regulation drops from the first operating ratio R11 to the fourth operating ratio R14.

Under the circumstance that the energy storage unit 11 is in the normal charge state, when the operating frequency of the power grid 3 measured by the measurement unit 12 is greater than or equal to the sixth frequency boundary value f16 and less than or equal to a seventh frequency boundary value f17 (i.e., between the operating points 1G and 1H), the control unit 13 configures the regulation ratio of the power regulation to be substantially equal to the second lower limit corresponding to the operating frequency. In addition, the control unit 13 configures the seventh frequency boundary value f17 to be greater than the sixth frequency boundary value f16 and less than the fourth frequency fr4. When the operating frequency of the power grid 3 measured by the measurement unit 12 is greater than or equal to the seventh frequency boundary value f17 and less than or equal to an eighth frequency boundary value f18 (i.e., between the operating points 1H and 1I), the control unit 13 configures the regulation ratio of the power regulation to be less than or equal to the second lower limit corresponding to the operating frequency at the seventh frequency boundary value f17 and greater than or equal to the second lower limit corresponding to the operating frequency at the eighth frequency boundary value f18. Further, the control unit 13 configures the regulation ratio of the power regulation to decrease or remain constant as the operating frequency increases (as illustrated in FIG. 4A with an example of remaining constant). Moreover, the control unit 13 configures the eighth frequency boundary value f18 to be greater than the seventh frequency boundary value f17 and less than the fourth frequency fr4. When the operating frequency of the power grid 3 measured by the measurement unit 12 is greater than or equal to the eighth frequency boundary value f18 and less than or equal to the fourth frequency fr4 (i.e., between the operating points 1I and 1J), the control unit 13 configures the regulation ratio of the power regulation to decrease as the operating frequency increases. For example, the control unit 13 may configure the regulation ratio of the power regulation to be substantially equal to the second upper limit corresponding to the operating frequency.

When the operating frequency of the power grid 3 measured by the measurement unit 12 is greater than or equal to the fourth frequency fr4, in this embodiment, the electric utility does not permit the energy storage system 1 any adjustment flexibility (see FIG. 3), and thus the relations between the regulation ratio of the power regulation provided by the energy storage system 1 and the operating frequency of the power grid 3 would remain the same as shown in FIG. 3.

Figure 4B:
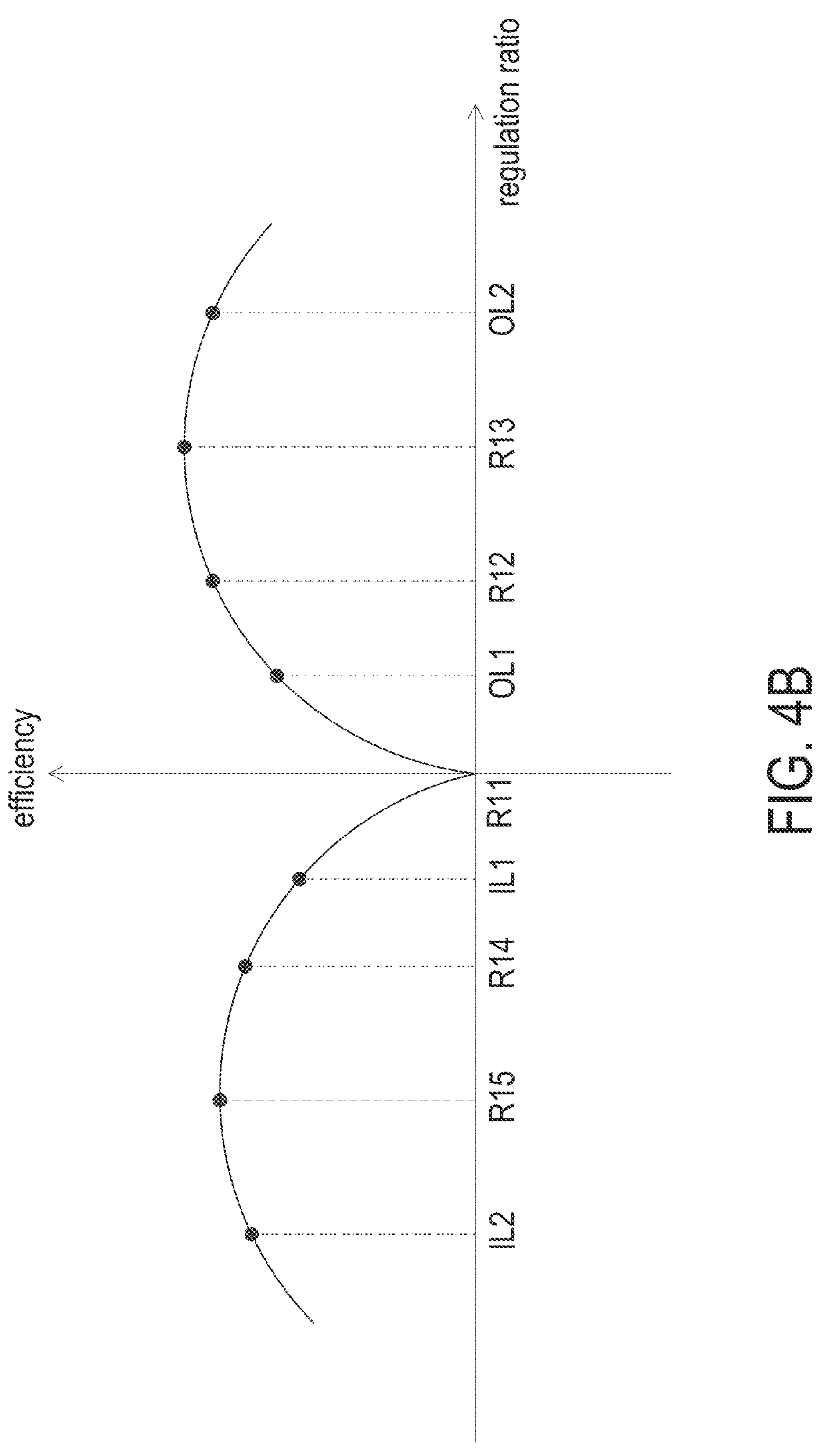
FIG. 4B is a schematic diagram illustrating an embodiment of the efficiency of the energy storage system in relation to the regulation ratio of the power regulation provided by the energy storage system when the energy storage unit is in the normal charge state.

FIG. 4B is a schematic diagram illustrating an embodiment of the charging and discharging efficiency of the energy storage system 1 in relation to the regulation ratio of the power regulation provided by the energy storage system 1 when the energy storage unit 11 is in the normal charge state. In FIG. 4B, the curve on the right is the supply efficiency curve of the energy storage system 1 when supplying power to the power grid 3, and the curve on the left is the charging efficiency curve of the energy storage system 1 when charging the energy storage unit 11 by the power grid 3. The supply efficiency curve and the charging efficiency curve shown in FIG. 4B are not necessarily linear or symmetrical. If the energy storage system 1 operates with a less optimal regulation ratio, it may result in poor efficiency of the energy storage system 1, potentially leading to loss and reducing the charging and discharging performance and lifespan of the energy storage system 1. For instance, when the operating frequency of the power grid 3 is at the first frequency boundary value f11, although the energy storage system 1 may theoretically supply power to the power grid 3 with the regulation ratio at the first output boundary value OL1, FIG. 4B shows that the efficiency of the energy storage system 1 at this regulation ratio is suboptimal. Therefore, in this embodiment, only when the operating frequency of the power grid 3 decreases to the third frequency boundary value f13, the energy storage system 1 supplies power to the power grid 3 with the regulation ratio at the second operating ratio R12. As shown in FIG. 4B, the efficiency of the energy storage system 1 is higher at the second operating ratio R12 compared to the first output boundary value OL1, enabling the energy storage system 1 to supply power to the power grid 3 more efficiently. Please refer to FIGS. 3, 4A and 4B. In an embodiment, under the circumstance that the energy storage unit 11 is in the normal charge state, when the operating frequency of the power grid 3 decreases from the third frequency boundary value f13 to the third frequency fr3, the efficiency of the first upper limit of the regulation ratio corresponding to the operating frequency may decrease as the operating frequency decreases in certain segments (according to the curve in FIG. 4B between the regulation ratios at the second operating ratio R12, the third operating ratio R13, and the second output boundary value OL2). Thus, the energy storage system 1 needs to select the regulation ratio that achieves the highest efficiency for supplying power to the power grid 3. For example, when the operating frequency of the power grid 3 is between the third frequency boundary value f13 and the fourth frequency boundary value f14, the energy storage system 1 may adopt the first upper limit of the regulation ratio to supply power to the power grid 3, and the corresponding efficiency curve is shown as the rising curve in the segment between the regulation ratios at the second operating ratio R12 and the third operating ratio R13 in FIG. 4B. The efficiency corresponding to the regulation ratio at the third operating ratio R13 is substantially optimal, and the efficiency starts to decrease when the regulation ratio exceeds the third operating ratio R13. Accordingly, when the operating frequency of the power grid 3 is between the fourth frequency boundary value f14 and the fifth frequency boundary value f15, the energy storage system 1 supplies power to the power grid 3 with the regulation ratio at the third operating ratio R13. When the operating frequency of the power grid 3 is between the fifth frequency boundary value f15 and the third frequency fr3, the energy storage system 1 adopts the first lower limit of the regulation ratio to supply power to the power grid 3 since the regulation ratio must be greater than or equal to the corresponding first lower limit. The corresponding efficiency curve is shown as the curve in the segment between the regulation ratios at the third operating ratio R13 and the second output boundary value OL2 in FIG. 4B. In an embodiment, the first lower limit of the regulation ratio corresponding to the fifth frequency boundary value f15 may be greater than the third operating ratio R13. Hence, when the operating frequency of the power grid 3 is at the fifth frequency boundary value f15, the energy storage system 1 must supply power to the power grid 3 at the first lower limit of the regulation ratio corresponding to the operating frequency.

In an embodiment, the selection of the third frequency boundary value f13 is based on the condition that the difference in efficiency between the energy storage system 1 operating at the second operating ratio R12 and at the first operating ratio R11 must be greater than the first efficiency threshold TH1. Namely, the third frequency boundary value f13 corresponding to the regulation ratio at the second operating ratio R12 is selected based on the condition that the efficiency of the energy storage system 1 operating with the regulation ratio at the second operating ratio R12 is greater than the efficiency of the energy storage system 1 operating with the regulation ratio at the first operating ratio R11 by the first efficiency threshold TH1. In another embodiment, when the operating frequency of the power grid 3 is between a first critical frequency fx and the predetermined supply frequency f0 (see FIG. 3), the regulation ratio of the power regulation provided by the energy storage system 1 is always at the first operating ratio R11. When the operating frequency of the power grid 3 decreases to be less than or equal to the first critical frequency fx, the energy storage system 1 must supply power to the power grid 3 at the regulation ratio greater than or equal to zero. In this case, the energy storage system 1 selects the regulation ratio that provides the highest efficiency within the allowed range as the second operating ratio R12 to supply power to the power grid 3.

Similarly, under the circumstance that the energy storage unit 11 is charged by the power grid 3, when the operating frequency of the power grid 3 is at the second frequency boundary value f12, although the energy storage system 1 may theoretically let the energy storage unit 11 be charged by the power grid 3 with the regulation ratio at the first input boundary value IL1, FIG. 4B shows that the efficiency of the energy storage system 1 at this regulation ratio is suboptimal. Therefore, in this embodiment, only when the operating frequency of the power grid 3 increases to the sixth frequency boundary value f16, the energy storage unit 11 is charged by the power grid 3 with the regulation ratio at the fourth operating ratio R14. As shown in FIG. 4B, the efficiency of the energy storage system 1 is higher at the fourth operating ratio R14 compared to the first input boundary value IL1, enabling the energy storage unit 11 to be charged by the power grid 3 more efficiently. Please refer to FIGS. 3, 4A and 4B. In an embodiment, under the circumstance that the energy storage unit 11 is in the normal charge state, when the operating frequency of the power grid 3 increases from the sixth frequency boundary value f16 to the fourth frequency fr4, the efficiency of the second lower limit of the regulation ratio corresponding to operating frequency may decrease as the operating frequency increases in certain segments (according to the curve in FIG. 4B between the regulation ratios at the fourth operating ratio R14, the fifth operating ratio R15, and the second input boundary value IL2). Thus, the energy storage system 1 needs to select the regulation ratio that achieves the highest efficiency for charging the energy storage unit 11 by the power grid 3. For example, when the operating frequency of the power grid 3 is between the sixth frequency boundary value f16 and the seventh frequency boundary value f17, the energy storage unit 11 may adopt the second lower limit of the regulation ratio to be charged by the power grid 3, and the corresponding efficiency curve is shown as the rising curve in the segment between the regulation ratios at the fourth operating ratio R14 and the fifth operating ratio R15 in FIG. 4B. The efficiency corresponding to the regulation ratio at the fifth operating ratio R15 is substantially optimal, and the efficiency starts to decrease when the regulation ratio is below the fifth operating ratio R15. Accordingly, when the operating frequency of the power grid 3 is between the seventh frequency boundary value f17 and the eighth frequency boundary value f18, the energy storage unit 11 is charged by the power grid 3 with the regulation ratio at the fifth operating ratio R15. When the operating frequency of the power grid 3 is between the eighth frequency boundary value f18 and the fourth frequency fr4, the energy storage unit 11 adopts the second upper limit of the regulation ratio to be charged by the power grid 3 since the regulation ratio must be less than or equal to the corresponding second upper limit. The corresponding efficiency curve is shown as the curve in the segment between the regulation ratios at the fifth operating ratio R15 and the second input boundary value IL2 in FIG. 4B. In an embodiment, the second upper limit of the regulation ratio corresponding to the eighth frequency boundary value f18 may be less than the fifth operating ratio R15. Hence, when the operating frequency of the power grid 3 is at the eighth frequency boundary value f18, the energy storage unit 11 must be charged by the power grid 3 at the second upper limit of the regulation ratio corresponding to the operating frequency.

In an embodiment, the selection of the sixth frequency boundary value f16 is based on the condition that the difference in efficiency between the energy storage system 1 operating at the fourth operating ratio R14 and at the first operating ratio R11 must be greater than the second efficiency threshold TH2. Namely, the sixth frequency boundary value f16 corresponding to the regulation ratio at the fourth operating ratio R14 is selected based on the condition that the efficiency of the energy storage system 1 operating with the regulation ratio at the fourth operating ratio R14 is greater than the efficiency of the energy storage system 1 operating with the regulation ratio at the first operating ratio R11 by the second efficiency threshold TH2. In another embodiment, when the operating frequency of the power grid 3 is between a second critical frequency fy and the predetermined supply frequency f0 (see FIG. 3), the regulation ratio of the power regulation provided by the energy storage system 1 is always at the first operating ratio R11. When the operating frequency of the power grid 3 increases to be greater than or equal to the second critical frequency fy, the energy storage unit 11 must be charged by the power grid 3 at the regulation ratio less than or equal to zero. In this case, the energy storage system 1 selects the regulation ratio that provides the highest efficiency within the allowed range to charge the energy storage unit 11 by the power grid 3.

Figure 4C:
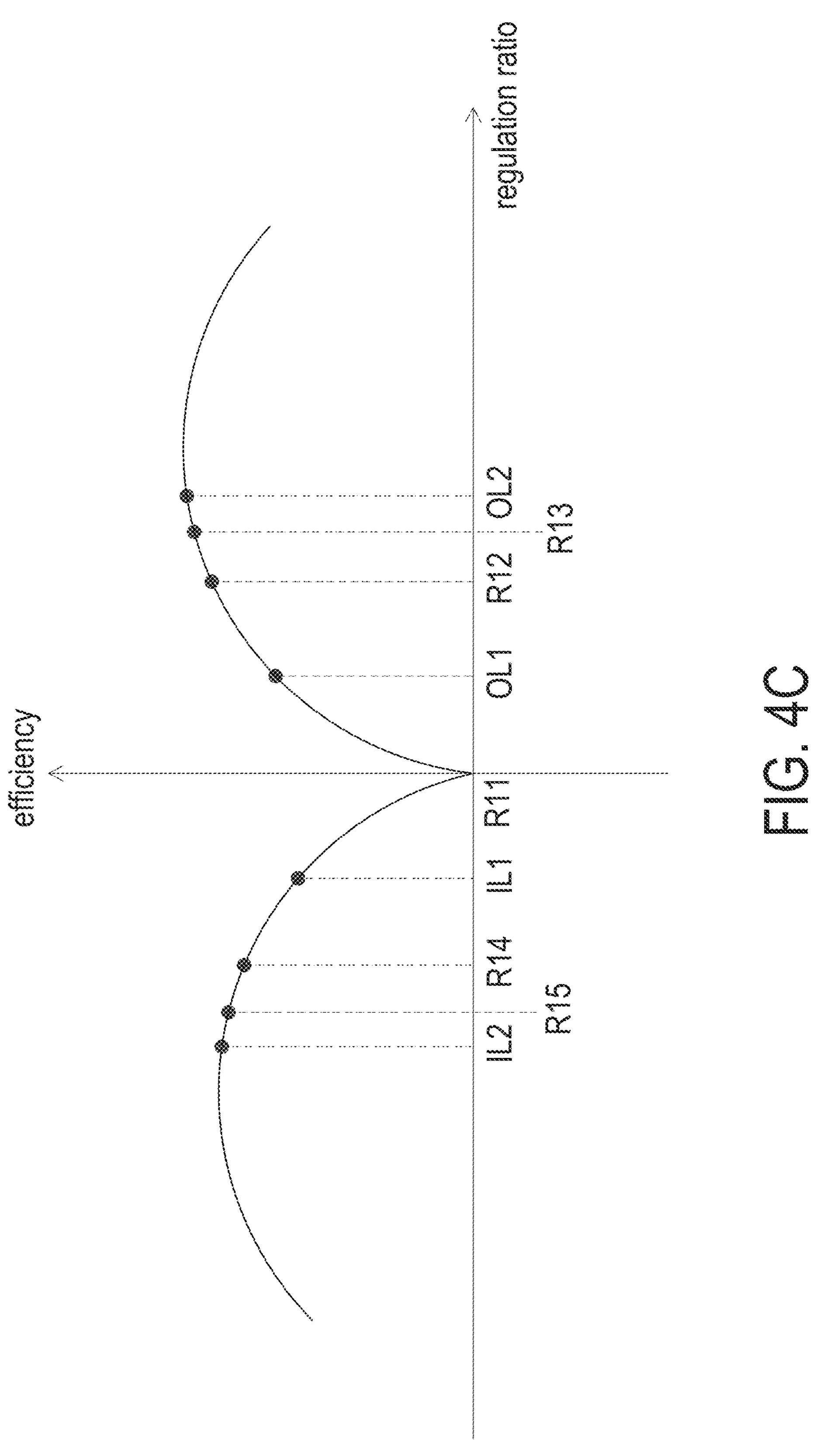
FIG. 4C is a schematic diagram illustrating another embodiment of the efficiency of the energy storage system 1 in relation to the regulation ratio of the power regulation provided by the energy storage system when the energy storage unit is in the normal charge state.

FIG. 4C is a schematic diagram illustrating another embodiment of the charging and discharging efficiency of the energy storage system 1 in relation to the regulation ratio of the power regulation provided by the energy storage system 1 when the energy storage unit 11 is in the normal charge state. Compared to the embodiment of FIG. 4B, in the embodiment of FIG. 4C, the supply efficiency curve shows that the efficiency corresponding to the third operating ratio R13 and/or the second output boundary value OL2 does not reach an optimal value, and the charging efficiency curve shows that the efficiency corresponding to the fifth operating ratio R15 and/or the second input boundary value IL2 does not reach an optimal value either. In the embodiment of FIG. 4C, due to performance limitations, the need to protect the lifespan of the energy storage unit 11, or other design considerations, the efficiency of the third operating ratio R13 and/or the fifth operating ratio R15 may not be optimal. For example, the third operating ratio R13 and the fifth operating ratio R15 may be set to equal the second operating ratio R12 and the fourth operating ratio R14 respectively. However, it is noted that the regulation ratio of the energy storage system 1 supplying power to the power grid 3 jumps from the first operating ratio R11 to the second operating ratio R12 when the operating frequency of the power grid 3 decreases to the third frequency boundary value f13, and/or the regulation ratio of charging the energy storage unit 11 by the power grid 3 drops from the first operating ratio R11 to the fourth operating ratio R14 when the operating frequency of the power grid 3 increases to the sixth frequency boundary value f16. Thereby, the supply efficiency and/or the charging efficiency is improved to optimize the energy storage system, thus the lifespan of the energy storage unit 11 is extended and the energy losses is reduced.

Figure 5A:
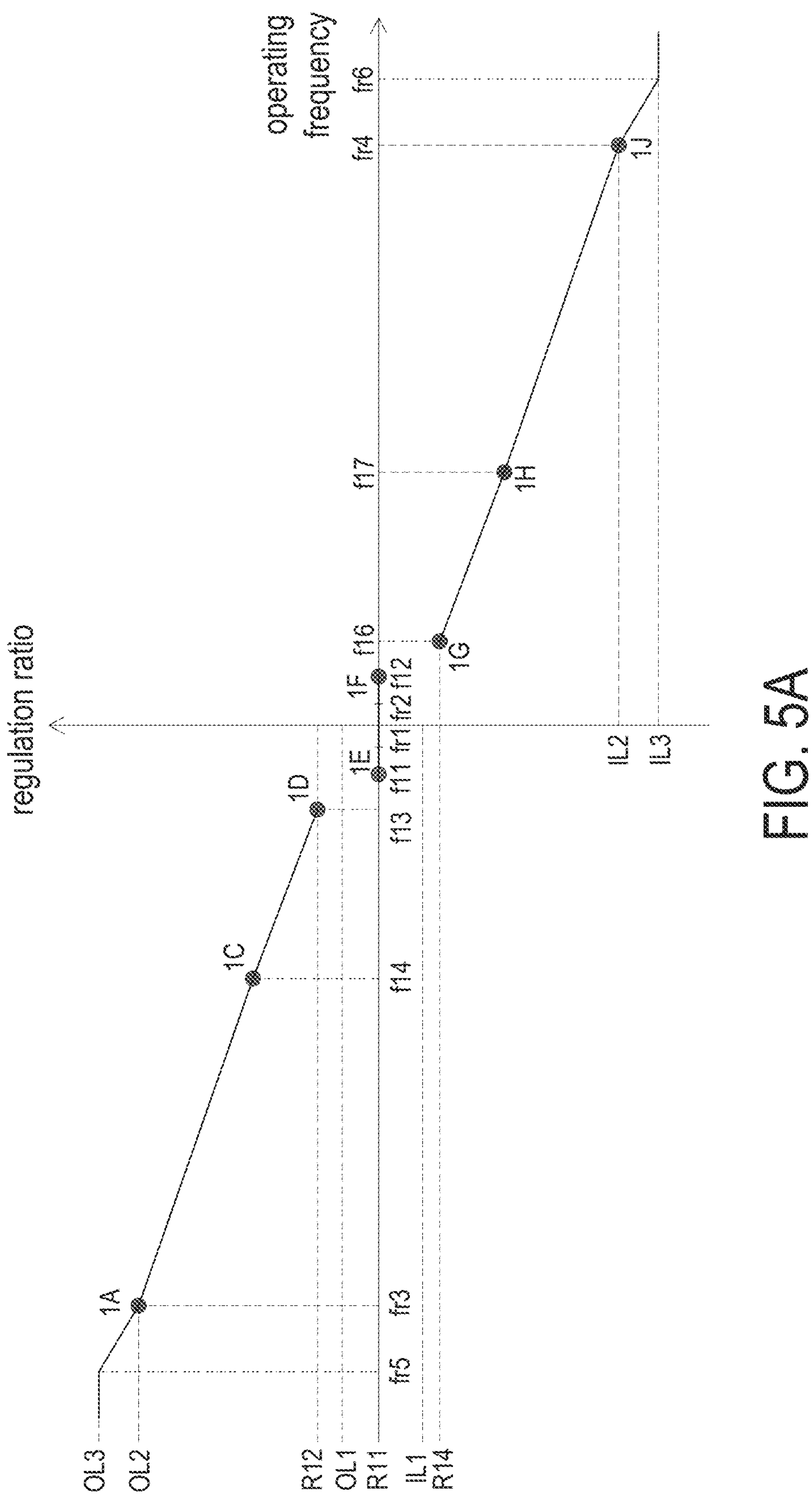
FIG. 5A is a schematic diagram illustrating another embodiment of the regulation ratio of the power regulation provided by the energy storage system corresponding to the operating frequency of the power grid when the energy storage unit is in the normal charge state.
Figure 5B:
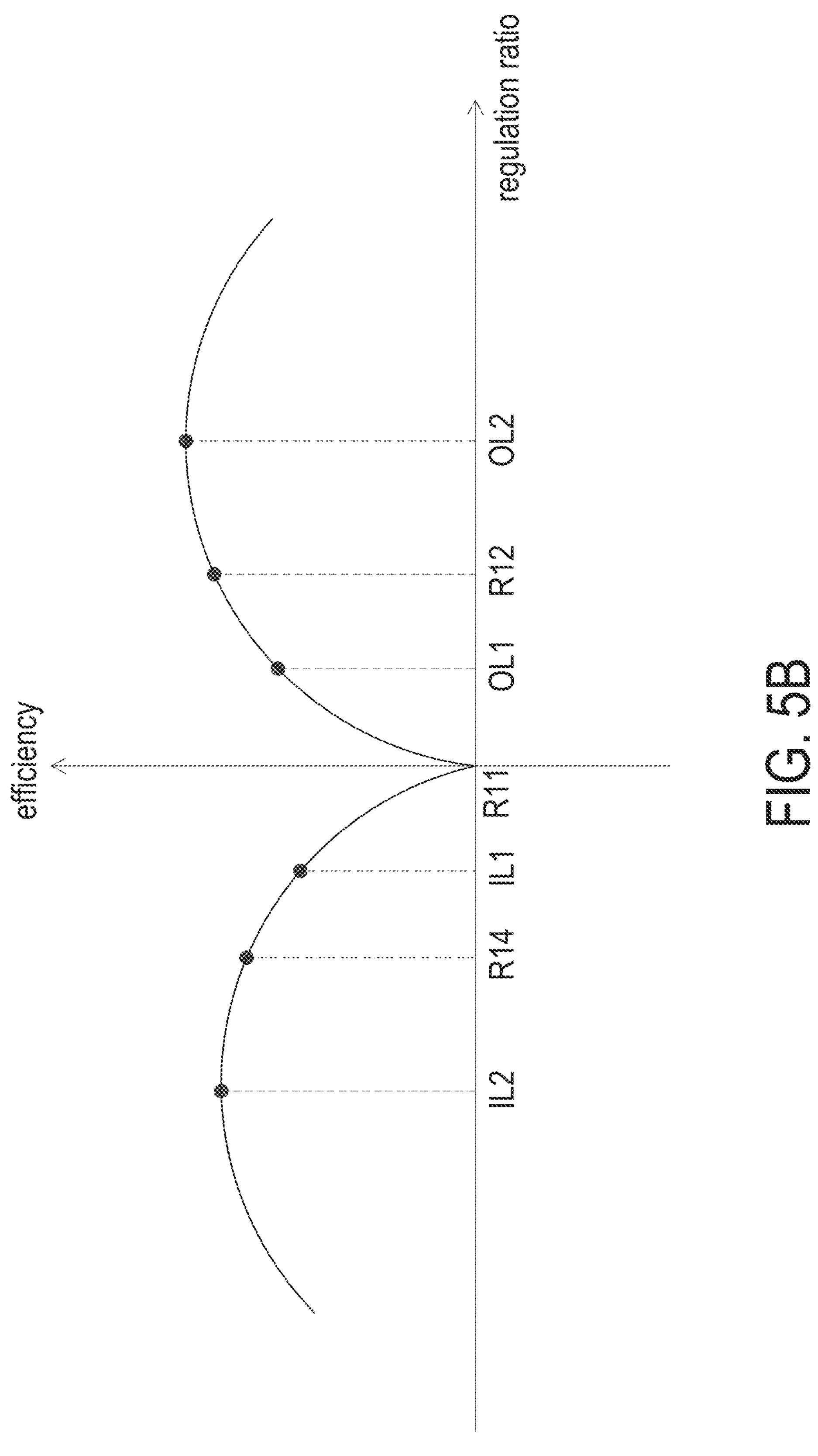
FIG. 5B is a schematic diagram illustrating another embodiment of the efficiency of the energy storage system in relation to the regulation ratio of the power regulation provided by the energy storage system when the energy storage unit is in the normal charge state.

In other embodiments, the regulation ratio of the power regulation provided by the energy storage system 1 may be adjusted according to the efficiency curve of the energy storage system 1. For example, FIG. 5A is a schematic diagram illustrating another embodiment of the regulation ratio of the power regulation provided by the energy storage system 1 corresponding to the operating frequency of the power grid 3 when the energy storage unit 11 is in the normal charge state, and FIG. 5B is a schematic diagram illustrating another embodiment of the efficiency of the energy storage system 1 in relation to the regulation ratio of the power regulation provided by the energy storage system 1 when the energy storage unit 11 is in the normal charge state. In FIG. 5A, the operating points corresponding to those in FIG. 4A are designated by identical numeral references, and detailed descriptions thereof are omitted herein. In this embodiment, as shown in FIGS. 5A and 5B, when the energy storage system 1 supplies power to the power grid 3, optimal efficiency is achieved when the energy storage system 1 supplies power to the power grid 3 with the regulation ratio at the second output boundary value OL2. Accordingly, when the operating frequency of the power grid 3 measured by the measurement unit 12 is greater than or equal to the third frequency fr3 and less than or equal to the third frequency boundary value f13 (i.e., between the operating points 1A and 1D), the control unit 13 configures the regulation ratio of the power regulation to be substantially equal to the first upper limit corresponding to the operating frequency, thereby optimizing the efficiency of the energy storage system 1. In addition, optimal efficiency is achieved when the energy storage unit 11 is charged by the power grid 3 with the regulation ratio at the second input boundary value IL2. Accordingly, when the operating frequency of the power grid 3 measured by the measurement unit 12 is greater than or equal to the sixth frequency boundary value f16 and less than or equal to the fourth frequency fr4 (i.e., between the operating points 1G and 1J), the control unit 13 configures the regulation ratio of the power regulation to be substantially equal to the second lower limit corresponding to the operating frequency, thereby optimizing the efficiency of the energy storage system 1.

Figure 6A:
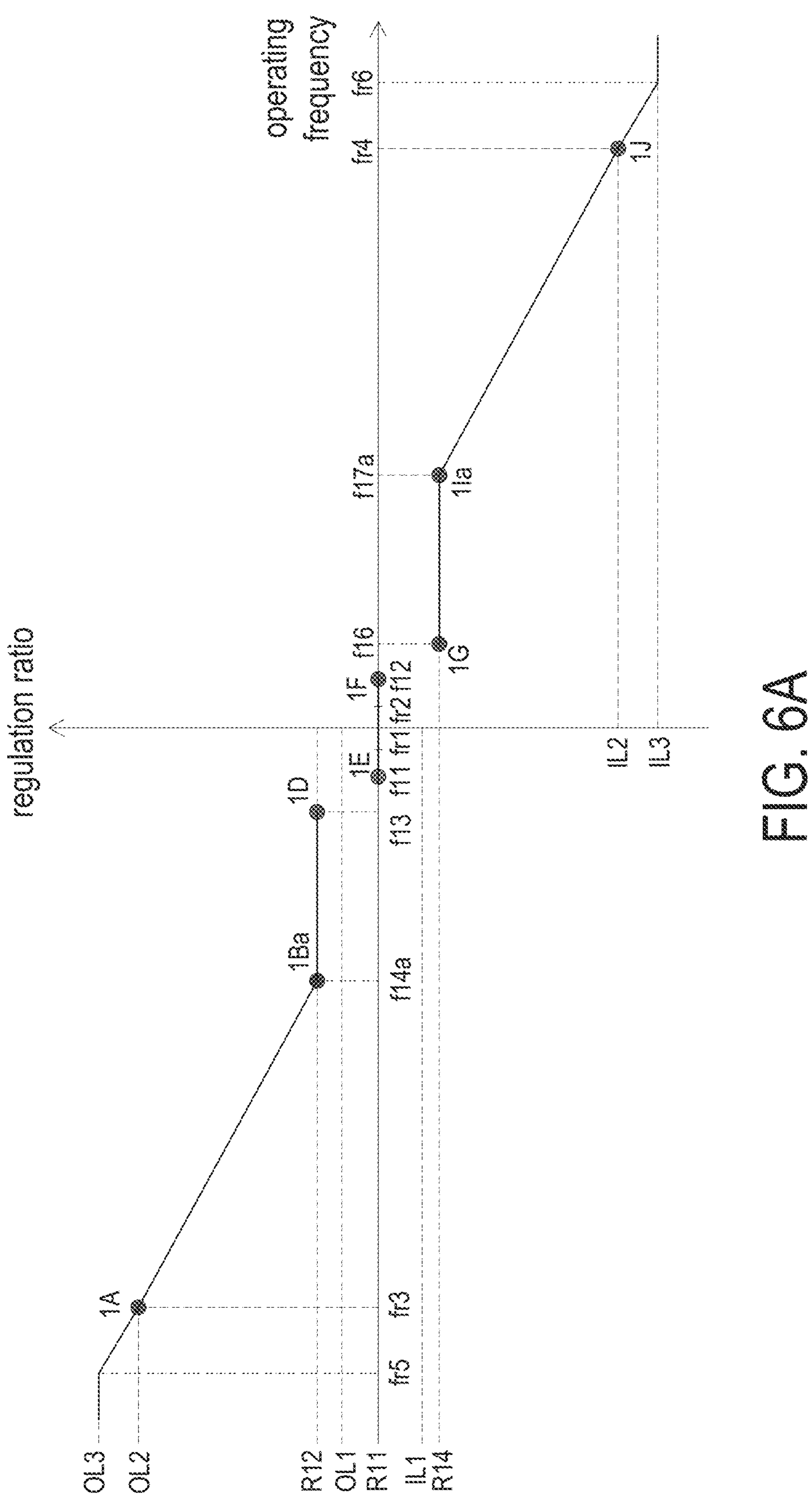
FIG. 6A is a schematic diagram illustrating another embodiment of the regulation ratio of the power regulation provided by the energy storage system corresponding to the operating frequency of the power grid when the energy storage unit is in the normal charge state.
Figure 6B:
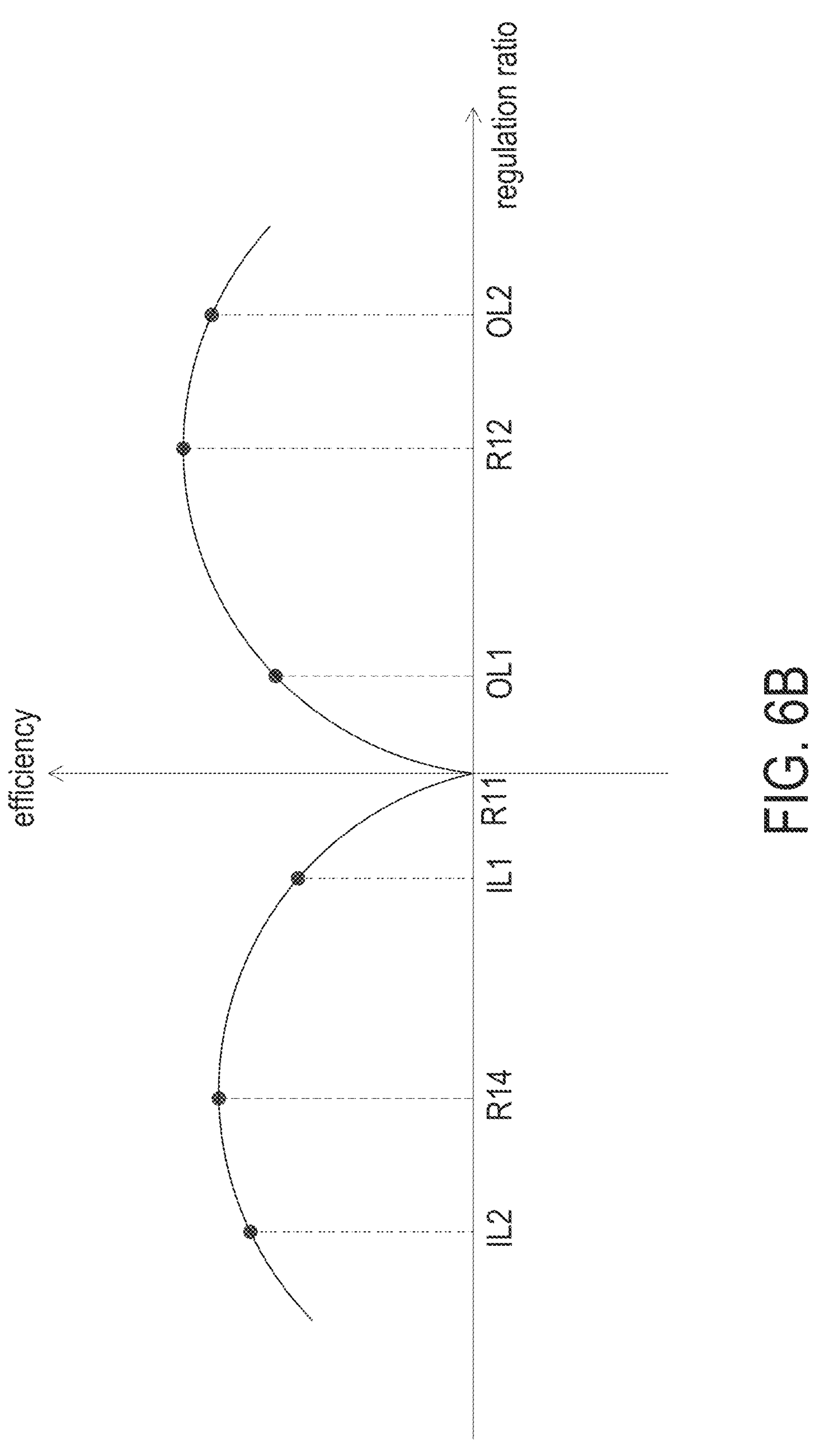
FIG. 6B is a schematic diagram illustrating another embodiment of the efficiency of the energy storage system in relation to the regulation ratio of the power regulation provided by the energy storage system when the energy storage unit is in the normal charge state.

Based on the efficiency curve of the energy storage system 1 in another embodiment, FIG. 6A is a schematic diagram illustrating the regulation ratio of the power regulation provided by the energy storage system 1 corresponding to the operating frequency of the power grid 3 when the energy storage unit 11 is in the normal charge state, and FIG. 6B is a schematic diagram illustrating the efficiency of the energy storage system 1 in relation to the regulation ratio of the power regulation provided by the energy storage system 1 when the energy storage unit 11 is in the normal charge state. In FIG. 6A, the operating points corresponding to those in FIG. 4A are designated by identical numeral references, and detailed descriptions thereof are omitted herein. In this embodiment, as shown in FIGS. 6A and 6B, when the energy storage system 1 supplies power to the power grid 3, optimal efficiency is achieved when the energy storage system 1 supplies power to the power grid 3 with the regulation ratio at the second operating ratio R12. Accordingly, during the process of the operating frequency of the power grid 3 decreasing from the third frequency boundary value f13 to the third frequency fr3, the energy storage system 1 supplies power to the power grid 3 with the regulation ratio at the second operating ratio R12 until it must supply power to the power grid 3 at the lower limit of the regulation ratio. In specific, when the operating frequency of the power grid 3 measured by the measurement unit 12 is greater than or equal to a fourth frequency boundary value f14*a* and less than or equal to the third frequency boundary value f13 (i.e., between the operating points 1Ba and 1D), the control unit 13 configures the regulation ratio of the power regulation to be less than or equal to the first upper limit corresponding to the operating frequency at the fourth frequency boundary value f14*a* and greater than or equal to the first upper limit corresponding to the operating frequency at the third frequency boundary value f13. Further, the control unit 13 configures the regulation ratio of the power regulation to increase or remain constant as the operating frequency decreases (as illustrated in FIG. 6A with an example of remaining constant). Moreover, the control unit 13 configures the fourth frequency boundary value f14*a* to be greater than the third frequency fr3 and less than the third frequency boundary value f13. When the operating frequency of the power grid 3 measured by the measurement unit 12 is greater than or equal to the third frequency fr3 and less than or equal to the fourth frequency boundary value f14*a* (i.e., between the operating points 1A and 1Ba), the control unit 13 configures the regulation ratio of the power regulation to increase as the operating frequency decreases. For instance, the control unit 13 may configure the regulation ratio of the power regulation to be substantially equal to the first lower limit corresponding to the operating frequency. In another embodiment, similar to the embodiment of FIG. 4C, due to performance limitations, the need to protect the lifespan of the energy storage unit 11, or other design considerations, the efficiency of the second operating ratio R12 and/or the second output boundary value OL2 may not be optimal. While, since the regulation ratio of the energy storage system 1 supplying power to the power grid 3 may jump from the first operating ratio R11 to the second operating ratio R12, the supply efficiency is improved. Through improving the supply efficiency to optimize the energy storage system, the lifespan of the energy storage unit 11 is extended and the energy losses is reduced.

Similarly, when the energy storage unit 11 is charged by the power grid 3, optimal efficiency of the energy storage system 1 is achieved when the energy storage unit 11 is charged by the power grid 3 with the regulation ratio at the fourth operating ratio R14. Accordingly, during the process of the operating frequency of the power grid 3 increasing from the sixth frequency boundary value f16 to the fourth frequency fr4, the energy storage unit 11 is charged by the power grid 3 with the regulation ratio at the fourth operating ratio R14 until the energy storage unit 11 must be charged by the power grid at the upper limit of the regulation ratio. In specific, when the operating frequency of the power grid 3 measured by the measurement unit 12 is greater than or equal to the sixth frequency boundary value f16 and less than or equal to a seventh frequency boundary value f17*a* (i.e., between the operating points 1G and 1Ia), the control unit 13 configures the regulation ratio of the power regulation to be less than or equal to the second lower limit corresponding to the operating frequency at the sixth frequency boundary value f16 and greater than or equal to the second lower limit corresponding to the operating frequency at the seventh frequency boundary value f17*a*. Further, the control unit 13 configures the regulation ratio of the power regulation to decrease or remain constant as the operating frequency increases (as illustrated in FIG. 6A with an example of remaining constant). Moreover, the control unit 13 configures the seventh frequency boundary value f17*a* to be greater than the sixth frequency boundary value f16 and less than the fourth frequency fr4. When the operating frequency of the power grid 3 measured by the measurement unit 12 is greater than or equal to the seventh frequency boundary value f17*a* and less than or equal to the fourth frequency fr4 (i.e., between the operating points 1Ia and 1J), the control unit 13 configures the regulation ratio of the power regulation to decrease as the operating frequency increases. For instance, the control unit 13 may configure the regulation ratio of the power regulation to be substantially equal to the second upper limit corresponding to the operating frequency. In another embodiment, similar to the embodiment of FIG. 4C, due to performance limitations, the need to protect the lifespan of the energy storage unit 11, or other design considerations, the efficiency of the fourth operating ratio R14 and/or the second input boundary value IL2 may not be optimal. While, since the regulation ratio of charging the energy storage unit 11 by the power grid 3 may drop from the first operating ratio R11 to the fourth operating ratio R14, the charging efficiency is improved. Through improving the charging efficiency to optimize the energy storage system, the lifespan of the energy storage unit 11 is extended and the energy losses is reduced.

Figure 7A:
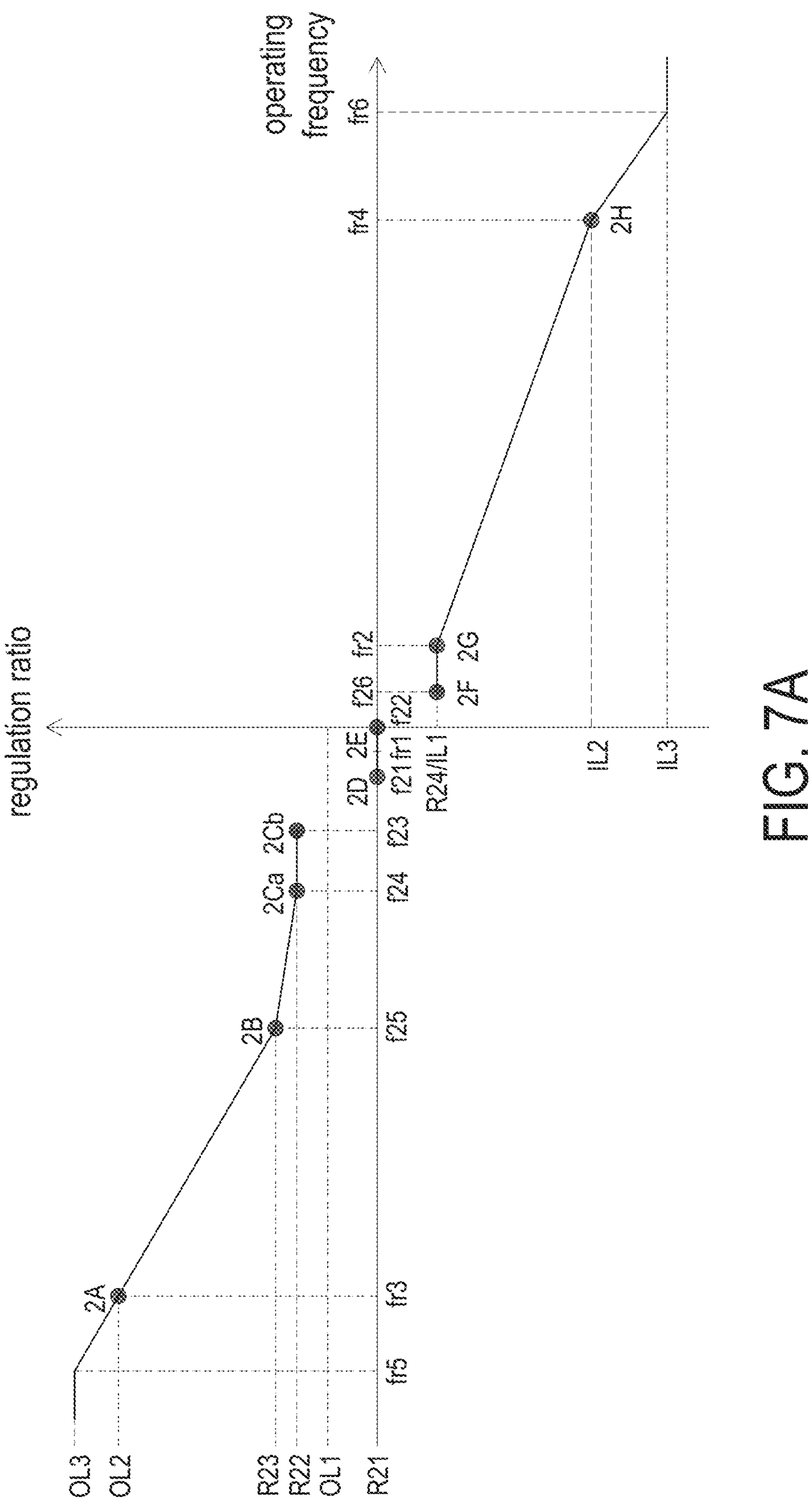
FIG. 7A is a schematic diagram illustrating an embodiment of the regulation ratio of the power regulation provided by the energy storage system corresponding to the operating frequency of the power grid when the energy storage unit is in a low charge state.

FIG. 7A is a schematic diagram illustrating an embodiment of the regulation ratio of the power regulation provided by the energy storage system 1 corresponding to the operating frequency of the power grid 3 when the energy storage unit 11 is in the low charge state. The curve in FIG. 7A is formed by connecting multiple discrete operating points, and each operating point represents a regulation ratio corresponding to an operating frequency. Under the circumstance that the energy storage unit 11 is in the low charge state, as shown in FIG. 7A, when the operating frequency of the power grid 3 measured by the measurement unit 12 is greater than or equal to a first frequency boundary value f21 and less than or equal to a second frequency boundary value f22 (i.e., between the operating points 2D and 2E, and for example, the second frequency boundary value f22 may be set to equal to the predetermined supply frequency f0, less than the predetermined supply frequency f0, or equal to the first frequency boundary value f21), the control unit 13 configures the regulation ratio of the power regulation to be a first operating ratio R21, where the first operating ratio R21 is less than or equal to 0 and greater than or equal to the first input boundary value IL1. In addition, the control unit 13 configures the first frequency boundary value f21 to be less than the first frequency fr1, and configures the second frequency boundary value f22 to be greater than the first frequency fr1 and less than the second frequency fr2. In an embodiment, the control unit 13 configures the first operating ratio R21 to be zero, which means that the energy storage system 1 neither supplies power to the power grid nor receives power from the power grid 3. In another embodiment, the energy storage system 1 includes an auxiliary power supply device 14 (as shown in FIG. 1), and thus the control unit 13 configures the first operating ratio R21 to be less than zero and makes an input power received by the energy storage system 1 from the power grid 3 be greater than or equal to an auxiliary power required by the auxiliary power supply device 14. Thereby, the auxiliary power supply device 14 is substantially powered by the power grid 3 directly. In this frequency range where the power regulation is not required, through setting the first operating ratio R21 to be less than zero, the auxiliary power supply device 14 is directly powered by the power grid 3. This setup does not cause a burden on the power grid 3, and can prevent the energy loss that may occur if the power is first stored in the energy storage unit 11 and then supplied to the auxiliary power supply device 14. Furthermore, the unnecessary charging and discharging cycles are reduced, thereby extending the lifespan of the energy storage unit 11.

When the operating frequency of the power grid 3 measured by the measurement unit 12 is greater than or equal to the third frequency fr3 and less than or equal to a third frequency boundary value f23 (i.e., between the operating points 2A and 2Cb), the control unit 13 configures the regulation ratio of the power regulation to be less than or equal to the second output boundary value OL2 and greater than or equal to a second operating ratio R22. The third frequency boundary value f23 is greater than the third frequency fr3 and less than the first frequency boundary value f21. The second operating ratio R22 is greater than the first operating ratio R21, and the efficiency of the energy storage system 1 supplying power to the power grid 3 at the second operating ratio R22 is greater than the efficiency of the energy storage system 1 supplying power to the power grid 3 at the first operating ratio R21 by a third efficiency threshold TH3. As shown in FIG. 7A, when the operating frequency of the power grid 3 decreases from the first frequency boundary value f21 to the third frequency boundary value f23, the regulation ratio of the power regulation jumps from the first operating ratio R21 to the second operating ratio R22 correspondingly.

In an embodiment, when the operating frequency of the power grid 3 measured by the measurement unit 12 is greater than or equal to a fourth frequency boundary value f24 and less than or equal to the third frequency boundary value f23 (i.e., between the operating points 2Ca and 2Cb), the control unit 13 configures the regulation ratio of the power regulation to remain constant as the operating frequency decreases. In addition, the control unit 13 configures the fourth frequency boundary value f24 to be greater than the third frequency fr3 and less than the third frequency boundary value f23. By appropriately selecting the specific value of the third efficiency threshold TH3 and maintaining a constant regulation ratio between the operating points 2Ca and 2Cb as the operating frequency decreases, the energy storage system 1 supplies power to the power grid 3 at an efficient and minimal rate to provide the power regulation for the power grid 3. Consequently, both the power regulation and the discharging amount of the energy storage system 1 are taken into consideration to prevent the state of charge of the energy storage unit 11 from getting too low and to protect the energy storage unit 11 from potential damage.

When the operating frequency of the power grid 3 measured by the measurement unit 12 is greater than or equal to a fifth frequency boundary value f25 and less than or equal to the fourth frequency boundary value f24 (i.e., between the operating points 2B and 2Ca), the control unit 13 configures the regulation ratio of the power regulation to be less than or equal to the first lower limit corresponding to the operating frequency at the fifth frequency boundary value f25 and greater than or equal to the first lower limit corresponding to the operating frequency at the fourth frequency boundary value f24. Further, the control unit 13 configures the regulation ratio of the power regulation to increase as the operating frequency decreases. Moreover, the control unit 13 configures the fifth frequency boundary value f25 to be greater than the third frequency fr3 and less than the fourth frequency boundary value f24. When the operating frequency of the power grid 3 measured by the measurement unit 12 is greater than or equal to the third frequency fr3 and less than or equal to the fifth frequency boundary value f25 (i.e., between the operating points 2A and 2B), the control unit 13 configures the regulation ratio of the power regulation to increase as the operating frequency decreases. For example, the control unit 13 may configure the regulation ratio of the power regulation to be substantially equal to the first lower limit corresponding to the operating frequency.

When the operating frequency of the power grid 3 measured by the measurement unit 12 is less than or equal to the third frequency fr3, in this embodiment, the electric utility does not permit the energy storage system 1 any adjustment flexibility (see FIG. 3), and thus the relations between the regulation ratio of the power regulation provided by the energy storage system 1 and the operating frequency of the power grid 3 would remain the same as shown in FIG. 3.

In addition, when the operating frequency of the power grid 3 measured by the measurement unit 12 is greater than or equal to a sixth frequency boundary value f26 and less than or equal to the fourth frequency fr4 (i.e., between the operating points 2F and 2H), the control unit 13 configures the regulation ratio of the power regulation to be less than or equal to a fourth operating ratio R24 and greater than or equal to the second input boundary value IL2. The sixth frequency boundary value f26 is greater than the second frequency boundary value f22 and less than the fourth frequency fr4. The fourth operating ratio R24 is less than the first operating ratio R21, and the efficiency of charging the energy storage unit 11 by the power grid 3 at the fourth operating ratio R24 is greater than the efficiency of charging the energy storage unit 11 by the power grid 3 at the first operating ratio R21 by a fourth efficiency threshold TH4. As shown in FIG. 7A, when the operating frequency of the power grid 3 increases from the second frequency boundary value f22 to the sixth frequency boundary value f26, the regulation ratio of the power regulation drops from the first operating ratio R21 to the fourth operating ratio R24. In this embodiment, the fourth operating ratio R24 is substantially equal to the first input boundary value IL1.

When the operating frequency of the power grid 3 measured by the measurement unit 12 is greater than or equal to the sixth frequency boundary value f26 and less than or equal to the second frequency fr2 (i.e., between the operating points 2F and 2G), the control unit 13 configures the regulation ratio of the power regulation to substantially equal to the first input boundary value IL1. Additionally, the control unit 13 configures the sixth frequency boundary value f26 to be greater than the second frequency boundary value f22 and less than the second frequency fr2. When the operating frequency of the power grid 3 measured by the measurement unit 12 is greater than or equal to the second frequency fr2 and less than or equal to the fourth frequency fr4, the control unit 13 configures the regulation ratio of the power regulation to decrease as the operating frequency increases. For example, the control unit 13 may configure the regulation ratio of the power regulation to be substantially equal to the second lower limit corresponding to the operating frequency.

When the operating frequency of the power grid 3 measured by the measurement unit 12 is greater than or equal to the fourth frequency fr4, in this embodiment, the electric utility does not permit the energy storage system 1 any adjustment flexibility (see FIG. 3), and thus the relations between the regulation ratio of the power regulation provided by the energy storage system 1 and the operating frequency of the power grid 3 would remain the same as shown in FIG. 3.

Figure 7B:
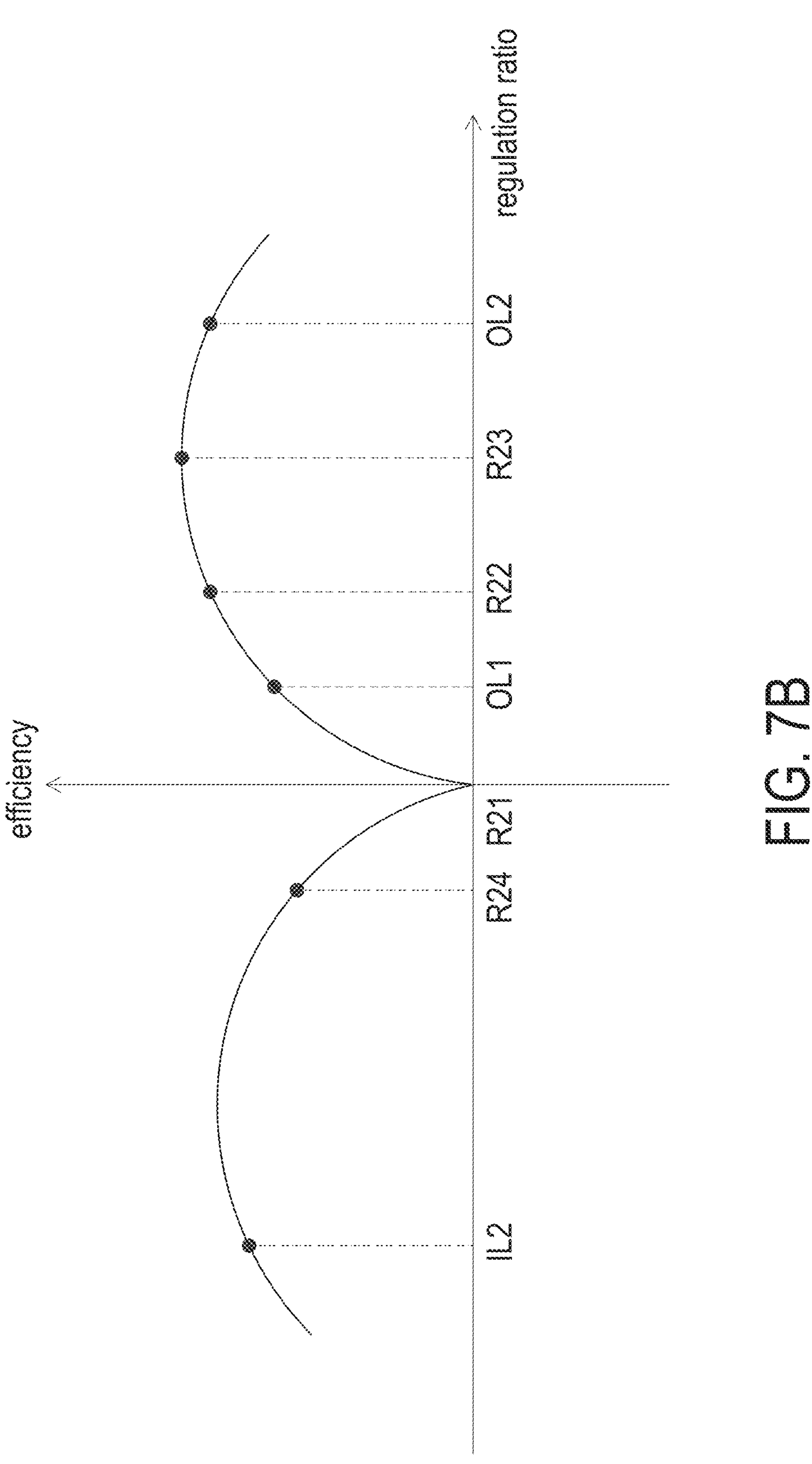
FIG. 7B is a schematic diagram illustrating an embodiment of the efficiency of the energy storage system in relation to the regulation ratio of the power regulation provided by the energy storage system when the energy storage unit is in the low charge state.

FIG. 7B is a schematic diagram illustrating an embodiment of the efficiency of the energy storage system 1 in relation to the regulation ratio of the power regulation provided by the energy storage system 1 when the energy storage unit 11 is in the low charge state. In FIG. 7B, the curve on the right is the supply efficiency curve of the energy storage system 1 when supplying power to the power grid 3, and the curve on the left is the charging efficiency curve of the energy storage system 1 when charging the energy storage unit 11 by the power grid 3. The supply efficiency curve and the charging efficiency curve shown in FIG. 7B are not necessarily linear or symmetrical. If the energy storage system 1 operates with a less optimal regulation ratio, it may result in poor efficiency of the energy storage system 1, potentially leading to loss and reducing the charging and discharging performance and lifespan of the energy storage system 1. For instance, when the operating frequency of the power grid 3 is at the first frequency boundary value f21, although the energy storage system 1 may theoretically supply power to the power grid 3 with the regulation ratio at the first output boundary value OL1, FIG. 7B shows that the efficiency of the energy storage system 1 at this regulation ratio is suboptimal. Therefore, in this embodiment, only when the operating frequency of the power grid 3 decreases to the third frequency boundary value f23, the energy storage system 1 supplies power to the power grid 3 with the regulation ratio at the second operating ratio R22. As shown in FIG. 7B, the efficiency of the energy storage system 1 is higher at the second operating ratio R22 compared to the first output boundary value OL1, enabling the energy storage system 1 to supply power to the power grid 3 more efficiently. Please refer to FIGS. 3, 7A and 7B. In an embodiment, under the circumstance that the energy storage unit 11 is in the low charge state, when the operating frequency of the power grid 3 decreases from the third frequency boundary value f23 to the third frequency fr3, the efficiency of the first upper limit of the regulation ratio corresponding to the operating frequency may decrease as the operating frequency decreases in certain segments (according to the curve in FIG. 7B between the regulation ratios at the second operating ratio R22, the third operating ratio R23, and the second output boundary value OL2). Thus, the energy storage system 1 needs to balance between the efficiency and the state of charge of the energy storage unit 11 to select a proper regulation ratio for supplying power to the power grid 3. For example, when the operating frequency of the power grid 3 is between the third frequency boundary value f23 and the fourth frequency boundary value f24, the energy storage system 1 adopts the regulation ratio at the second operating ratio R22 to supply power to the power grid 3. Thereby, the energy storage system 1 supplies power to the power grid 3 at an efficient and minimal rate to provide the power regulation for the power grid 3, and both the power regulation and the discharging amount of the energy storage system 1 are taken into consideration to prevent the state of charge of the energy storage unit 11 from getting too low and to protect the energy storage unit 11 from potential damage. When the operating frequency of the power grid 3 is between the fourth frequency boundary value f24 and the fifth frequency boundary value f25, as the operating frequency of the power grid 3 decreases, the regulation ratio adopted by the energy storage system 1 increases, and meanwhile the efficiency of the energy storage system 1 gradually increases. The corresponding efficiency curve is shown as the curve in the segment between the regulation ratios at the second operating ratio R22 and the third operating ratio R23 in FIG. 7B. The efficiency corresponding to the regulation ratio at the third operating ratio R23 is substantially optimal, and the efficiency starts to decrease when the regulation ratio exceeds the third operating ratio R23. When the operating frequency of the power grid 3 is between the fifth frequency boundary value f25 and the third frequency fr3, the energy storage system 1 adopts the first lower limit of the regulation ratio to supply power to the power grid 3 since the regulation ratio must be greater than or equal to the corresponding first lower limit. The corresponding efficiency curve is shown as the curve in the segment between the regulation ratios at the third operating ratio R23 and the second output boundary value OL2 in FIG. 7B.

In an embodiment, the selection of the third frequency boundary value f23 is based on the condition that the difference in efficiency between the energy storage system 1 operating at the second operating ratio R22 and at the first operating ratio R21 must be greater than the third efficiency threshold TH3. Namely, the third frequency boundary value f23 corresponding to the regulation ratio at the second operating ratio R22 is selected based on the condition that the efficiency of the energy storage system 1 operating with the regulation ratio at the second operating ratio R22 is greater than the efficiency of the energy storage system 1 operating with the regulation ratio at the first operating ratio R21 by the third efficiency threshold TH3. In another embodiment, when the operating frequency of the power grid 3 is between the first critical frequency fx and the predetermined supply frequency f0 (see FIG. 3), the regulation ratio of the power regulation provided by the energy storage system 1 is always at the first operating ratio R21. When the operating frequency of the power grid 3 decreases to the first critical frequency fx, the energy storage system 1 must supply power to the power grid 3 at the regulation ratio greater than or equal to zero. In this case, the energy storage system 1 selects the regulation ratio that provides the highest efficiency within the allowed range as the second operating ratio R22 to supply power to the power grid 3.

In the case of charging the energy storage unit 11 by the power grid 3, since the energy storage unit 11 is already in the low charge state, the energy storage system 1 prioritizes increasing the state of charge of the energy storage unit 11 when selecting the regulation ratio. For example, when the operating frequency of the power grid 3 is between the sixth frequency boundary value f26 and the second frequency fr2, the energy storage unit 11 is charged by the power grid 3 at the lower limit of the regulation ratio (i.e., the first input boundary value IL1). When the operating frequency of the power grid 3 is between the second frequency fr2 and the fourth frequency fr4, the energy storage unit 11 is charged by the power grid 3 at the second lower limit of the regulation ratio corresponding to the operating frequency.

Given that the state of charge of the energy storage unit 11 is low, the sixth frequency boundary value f26 may be set as close as possible to the first frequency boundary value f21 to expedite charging the energy storage unit 11 and prevent potential damage to the energy storage unit 11. In another embodiment, to increase the stage of charge of the energy storage unit 11 as much as possible, when the operating frequency of the power grid 3 measured by the measurement unit 12 is greater than or equal to the first frequency boundary value f21 and less than or equal to the first frequency fr1, the control unit 13 configures the regulation ratio of the power regulation to equal the fourth operating ratio R24 or the first input boundary value IL1. In another embodiment, similar to the embodiment of FIG. 4C, due to performance limitations, the need to protect the lifespan of the energy storage unit 11, or other design considerations, in the supply efficiency curve, the efficiency of the second operating ratio R22, the third operating ratio R23 and/or the second output boundary value OL2 may not be optimal. Similarly, in the charging efficiency curve, the efficiency of the fourth operating ratio R24 and/or the second input boundary value IL2 may not be optimal. However, it is noted that the regulation ratio of the energy storage system 1 supplying power to the power grid 3 jumps from the first operating ratio R21 to the second operating ratio R22 when the operating frequency of the power grid 3 decreases to the third frequency boundary value f23, and/or the regulation ratio of charging the energy storage unit 11 by the power grid 3 drops from the first operating ratio R21 to the fourth operating ratio R24 when the operating frequency of the power grid 3 increases to the sixth frequency boundary value f26. Thereby, the supply efficiency and/or the charging efficiency are improved to optimize the energy storage system, thus the lifespan of the energy storage unit 11 is extended and the energy losses is reduced.

Figure 8:
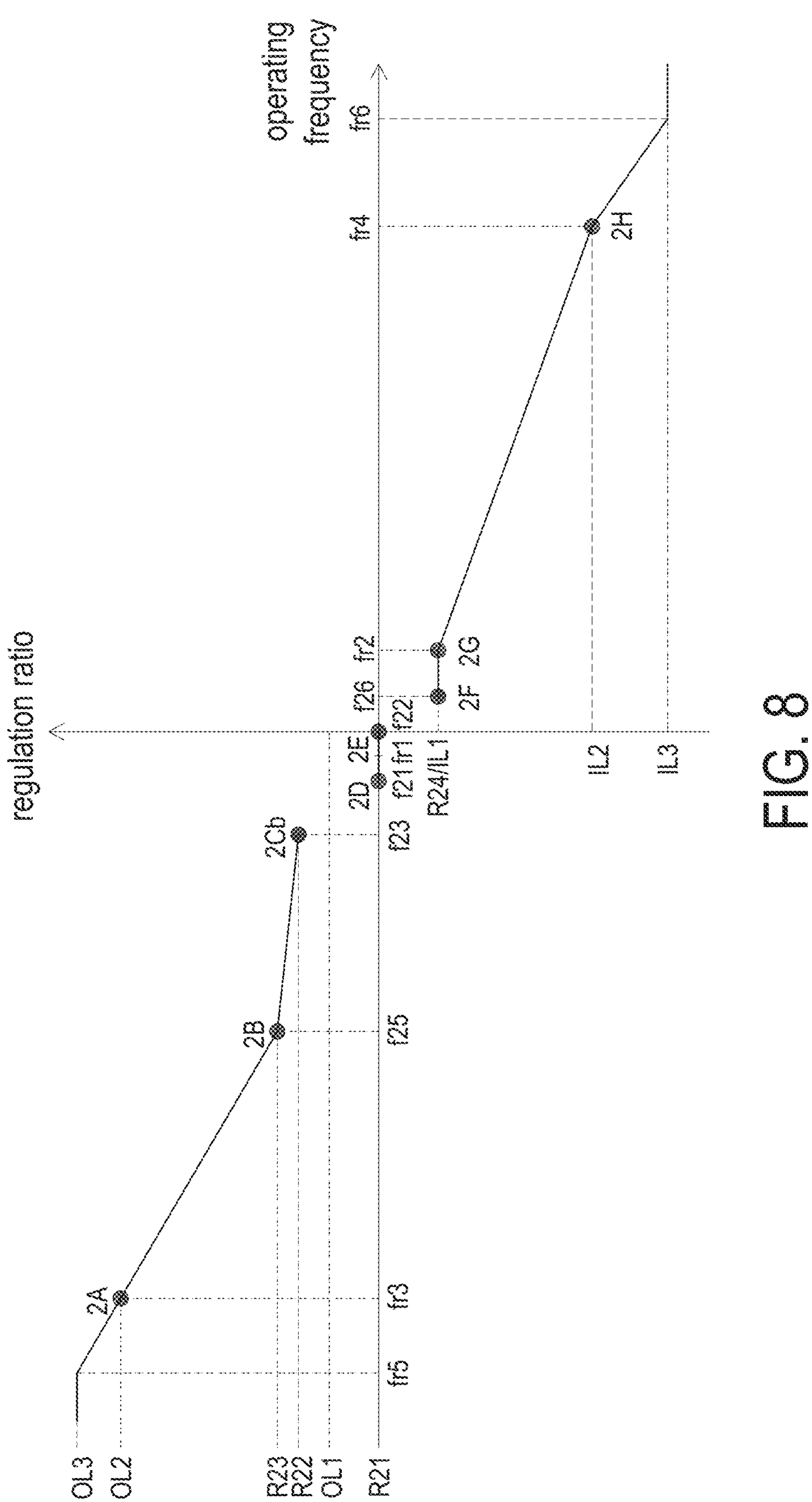
FIG. 8 is a schematic diagram illustrating another embodiment of the regulation ratio of the power regulation provided by the energy storage system corresponding to the operating frequency of the power grid when the energy storage unit is in the low charge state.

FIG. 8 is a schematic diagram illustrating another embodiment of the regulation ratio of the power regulation provided by the energy storage system 1 corresponding to the operating frequency of the power grid 3 when the energy storage unit 11 is in the low charge state. In FIG. 8, the operating points corresponding to those in FIG. 7A are designated by identical numeral references, and detailed descriptions thereof are omitted herein. In this embodiment, as shown in FIG. 8, when the operating frequency of the power grid 3 measured by the measurement unit 12 is greater than or equal to the fifth frequency boundary value f25 and less than or equal to the third frequency boundary value f23 (i.e., between the operating points 2B and 2Cb), the control unit 13 configures the regulation ratio of the power regulation to be less than or equal to the first lower limit corresponding to operating frequency at the fifth frequency boundary value f25 and greater than or equal to the first lower limit corresponding to the operating frequency at the third frequency boundary value f23. Further, the control unit 13 configures the regulation ratio of the power regulation to increase or remain constant as the operating frequency decreases (as illustrated in FIG. 8 with an example of increasing with the increment of the operating frequency). In the segment between the operating points 2B and 2Cb, if the control unit 13 configures the regulation ratio of the power regulation to remain constant as the operating frequency decreases, the energy storage system 1 supplies power to the power grid 3 at an efficient and minimal rate to provide the power regulation for the power grid 3, and both the power regulation and the discharging amount of the energy storage system 1 are taken into consideration to prevent the state of charge of the energy storage unit 11 from getting too low and to protect the energy storage unit 11 from potential damage. Alternatively, if the control unit 13 configures the regulation ratio of the power regulation to increase as the operating frequency decreases, the efficiency of the energy storage system 1 may be improved.

Figure 9A:
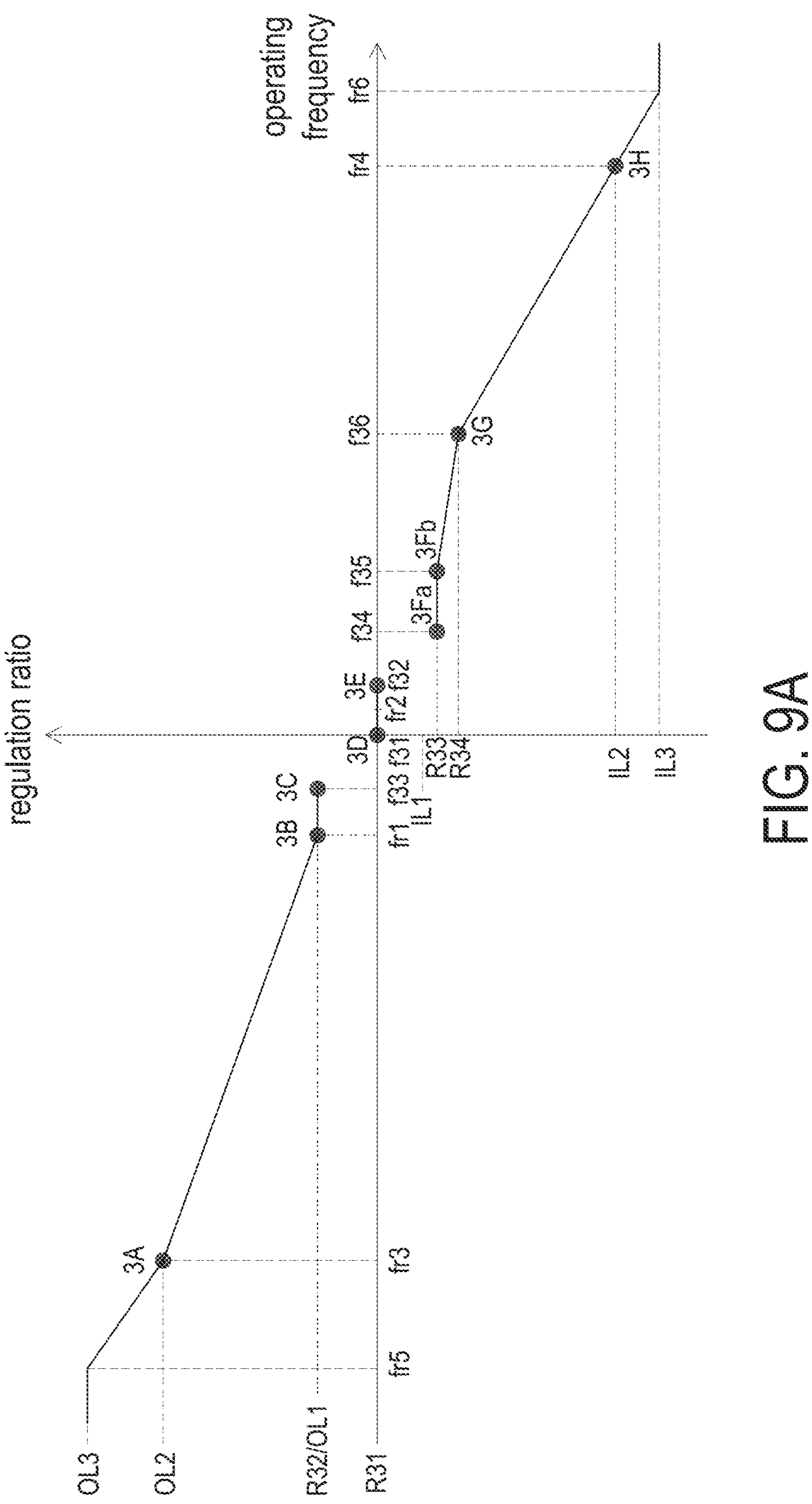
FIG. 9A is a schematic diagram illustrating an embodiment of the regulation ratio of the power regulation provided by the energy storage system 1 corresponding to the operating frequency of the power grid when the energy storage unit is in a high charge state.

FIG. 9A is a schematic diagram illustrating an embodiment of the regulation ratio of the power regulation provided by the energy storage system 1 corresponding to the operating frequency of the power grid 3 when the energy storage unit 11 is in the high charge state. The curve in FIG. 9A is formed by connecting multiple discrete operating points, and each operating point represents a regulation ratio corresponding to an operating frequency. Under the circumstance that the energy storage unit 11 is in the high charge state, as shown in FIG. 9A, when the operating frequency of the power grid 3 measured by the measurement unit 12 is greater than or equal to a first frequency boundary value f31 and less than or equal to a second frequency boundary value f32 (i.e., between the operating points 3D and 3E, and for example, the first frequency boundary value f31 may be set to equal to the predetermined supply frequency f0, greater than the predetermined supply frequency f0, or equal to the second frequency boundary value f32), the control unit 13 configures the regulation ratio of the power regulation to be a first operating ratio R31, where the first operating ratio R31 is less than or equal to 0 and greater than or equal to the first input boundary value IL1. In addition, the control unit 13 configures the second frequency boundary value f32 to be greater than the second frequency fr2, and configures the first frequency boundary value f31 to be greater than the first frequency fr1 and less than the second frequency fr2. In an embodiment, the control unit 13 configures the first operating ratio R31 to be zero, which means that the energy storage system 1 neither supplies power to the power grid nor receives power from the power grid 3. In another embodiment, the energy storage system 1 includes an auxiliary power supply device 14 (as shown in FIG. 1), and thus the control unit 13 configures the first operating ratio R31 to be less than zero and makes an input power received by the energy storage system 1 from the power grid 3 be greater than or equal to an auxiliary power required by the auxiliary power supply device 14. Thereby, the auxiliary power supply device 14 is substantially powered by the power grid 3 directly. In this frequency range where the power regulation is not required, through setting the first operating ratio R31 to be less than zero, the auxiliary power supply device 14 is directly powered by the power grid 3. This setup does not cause a burden on the power grid 3, and can prevent the energy loss that may occur if the power is first stored in the energy storage unit 11 and then supplied to the auxiliary power supply device 14. Furthermore, the unnecessary charging and discharging cycles are reduced, thereby extending the lifespan of the energy storage unit 11.

When the operating frequency of the power grid 3 measured by the measurement unit 12 is greater than or equal to the third frequency fr3 and less than or equal to a third frequency boundary value f33 (i.e., between the operating points 3A and 3C), the control unit 13 configures the regulation ratio of the power regulation to be less than or equal to the second output boundary value OL2 and greater than or equal to a second operating ratio R32. The third frequency boundary value f33 is greater than the third frequency fr3 and less than the first frequency boundary value f31. The second operating ratio R32 is greater than the first operating ratio R31, and the efficiency of the energy storage system 1 supplying power to the power grid 3 at the second operating ratio R32 is greater than the efficiency of the energy storage system 1 supplying power to the power grid 3 at the first operating ratio R31 by a fifth efficiency threshold TH5. As shown in FIG. 9A, when the operating frequency of the power grid 3 decreases from the first frequency boundary value f31 to the third frequency boundary value f33, the regulation ratio of the power regulation jumps from the first operating ratio R31 to the second operating ratio R32 correspondingly. In this embodiment, the second operating ratio R32 is substantially equal to the first output boundary value OL1.

In an embodiment, when the operating frequency of the power grid 3 measured by the measurement unit 12 is greater than or equal to the first frequency fr1 and less than or equal to the third frequency boundary value f33 (i.e., between the operating points 3B and 3C), the control unit 13 configures the regulation ratio of the power regulation to substantially equal to the first output boundary value OL1. Additionally, the control unit 13 configures the third frequency boundary value f33 to be greater than the first frequency fr1 and less than the first frequency boundary value f31. When the operating frequency of the power grid 3 measured by the measurement unit 12 is greater than or equal to the third frequency fr3 and less than or equal to the first frequency fr1, the control unit 13 configures the regulation ratio of the power regulation to increase as the operating frequency decreases. For example, the control unit 13 may configure the regulation ratio of the power regulation to be substantially equal to the first upper limit corresponding to the operating frequency.

When the operating frequency of the power grid 3 measured by the measurement unit 12 is less than or equal to the third frequency fr3, in this embodiment, the electric utility does not permit the energy storage system 1 any adjustment flexibility (see FIG. 3), and thus the relations between the regulation ratio of the power regulation provided by the energy storage system 1 and the operating frequency of the power grid 3 would remain the same as shown in FIG. 3.

In addition, when the operating frequency of the power grid 3 measured by the measurement unit 12 is greater than or equal to a fourth frequency boundary value f34 and less than or equal to the fourth frequency fr4 (i.e., between the operating points 3Fa and 3H), the control unit 13 configures the regulation ratio of the power regulation to be less than or equal to a third operating ratio R33 and greater than or equal to the second input boundary value IL2. The fourth frequency boundary value f34 is greater than the second frequency boundary value f32 and less than the fourth frequency fr4. The third operating ratio R33 is less than the first operating ratio R31, and the efficiency of charging the energy storage unit 11 by the power grid 3 at the third operating ratio R33 is greater than the efficiency of charging the energy storage unit 11 by the power grid 3 at the first operating ratio R31 by a sixth efficiency threshold TH6. As shown in FIG. 9A, when the operating frequency of the power grid 3 increases from the second frequency boundary value f32 to the fourth frequency boundary value f34, the regulation ratio of the power regulation drops from the first operating ratio R31 to the third operating ratio R33 correspondingly.

In an embodiment, when the operating frequency of the power grid 3 measured by the measurement unit 12 is greater than or equal to the fourth frequency boundary value f34 and less than or equal to a fifth frequency boundary value f35 (i.e., between the operating points 3Fa and 3Fb), the control unit 13 configures the regulation ratio of the power regulation to remain constant as the operating frequency increases. In addition, the control unit 13 configures the fifth frequency boundary value f35 to be greater than the fourth frequency boundary value f34 and less than the fourth frequency fr4. By maintaining a constant regulation ratio between the operating points 3Fa and 3Fb as the operating frequency increases, the energy storage system 1 receives power from the power grid 3 at an efficient and minimal rate to provide the power regulation for the power grid 3. Consequently, both the power regulation and the charging amount of the energy storage system 1 are taken into consideration to prevent the state of charge of the energy storage unit 11 from getting too high.

When the operating frequency of the power grid 3 measured by the measurement unit 12 is greater than or equal to the fifth frequency boundary value f35 and less than or equal to a sixth frequency boundary value f36 (i.e., between the operating points 3Fb and 3G), the control unit 13 configures the regulation ratio of the power regulation to be less than or equal to the second upper limit corresponding to the operating frequency at the fifth frequency boundary value f35 and greater than or equal to the second upper limit corresponding to the operating frequency at the sixth frequency boundary value f36. Further, the control unit 13 configures the regulation ratio of the power regulation to decrease as the operating frequency increases. Moreover, the control unit 13 configures the sixth frequency boundary value f36 to be greater than the fifth frequency boundary value f35 and less than the fourth frequency fr4. When the operating frequency of the power grid 3 measured by the measurement unit 12 is greater than or equal to the sixth frequency boundary value f36 and less than or equal to the fourth frequency fr4 (i.e., between the operating points 3G and 3H), the control unit 13 configures the regulation ratio of the power regulation to decrease as the operating frequency increases. For example, the control unit 13 may configure the regulation ratio of the power regulation to be substantially equal to the second upper limit corresponding to the operating frequency.

When the operating frequency of the power grid 3 measured by the measurement unit 12 is greater than or equal to the fourth frequency fr4, in this embodiment, the electric utility does not permit the energy storage system 1 any adjustment flexibility (see FIG. 3), and thus the relations between the regulation ratio of the power regulation provided by the energy storage system 1 and the operating frequency of the power grid 3 would remain the same as shown in FIG. 3.

Figure 9B:
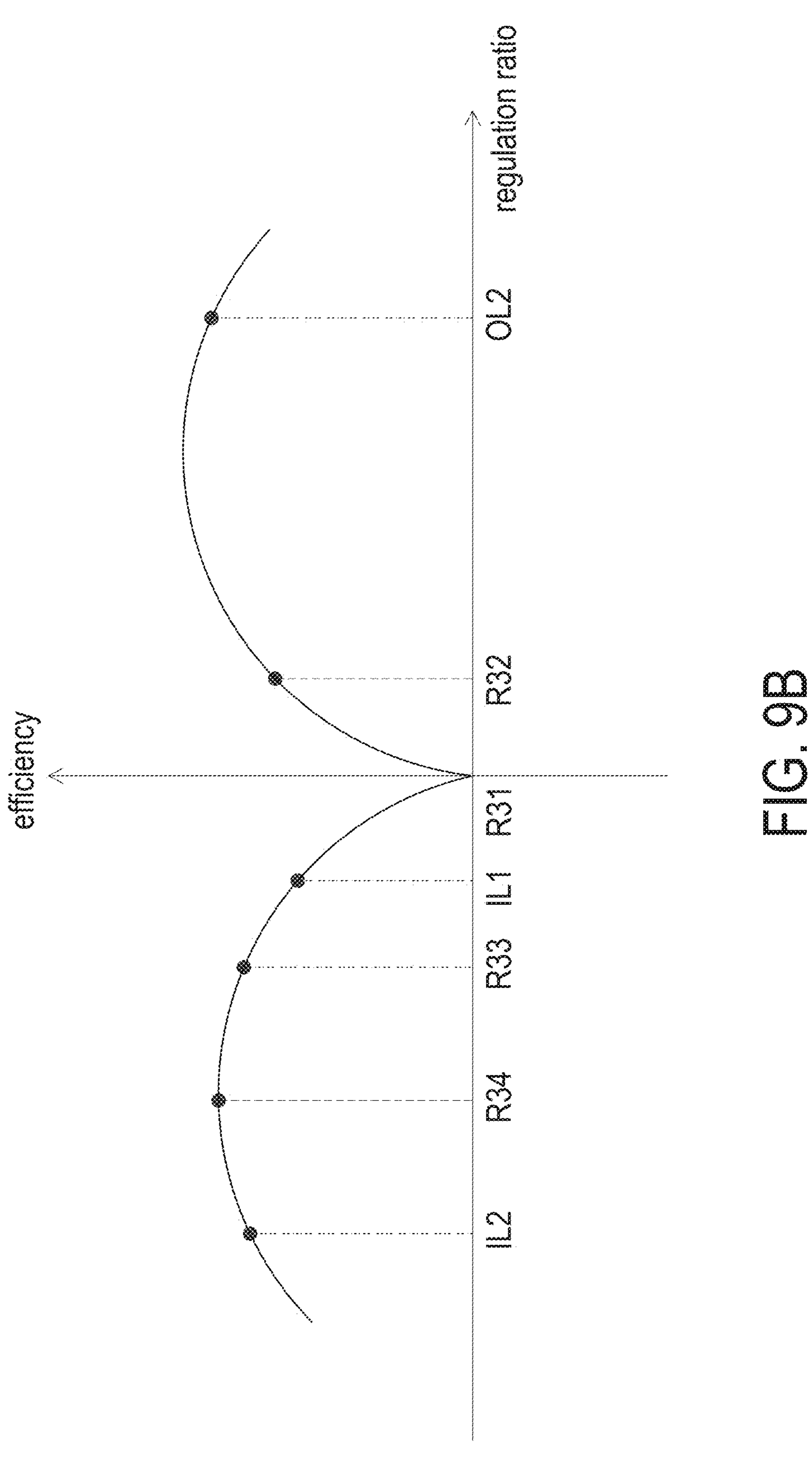
FIG. 9B is a schematic diagram illustrating an embodiment of the efficiency of the energy storage system in relation to the regulation ratio of the power regulation provided by the energy storage system when the energy storage unit is in the high charge state.

FIG. 9B is a schematic diagram illustrating an embodiment of the efficiency of the energy storage system 1 in relation to the regulation ratio of the power regulation provided by the energy storage system 1 when the energy storage unit 11 is in the high charge state. In FIG. 9B, the curve on the right is the supply efficiency curve of the energy storage system 1 when supplying power to the power grid 3, and the curve on the left is the charging efficiency curve of the energy storage system 1 when charging the energy storage unit 11 by the power grid 3. The supply efficiency curve and the charging efficiency curve shown in FIG. 9B are not necessarily linear or symmetrical. If the energy storage system 1 operates with a less optimal regulation ratio, it may result in poor efficiency of the energy storage system 1, potentially leading to loss and reducing the charging and discharging performance and lifespan of the energy storage system 1. In the case of the energy storage system 1 supplying power to the power grid 3, since the energy storage unit 11 is already in the high charge state, the energy storage system 1 prioritizes decreasing the state of charge of the energy storage unit 11 when selecting the regulation ratio. For example, when the operating frequency of the power grid 3 is between the third frequency boundary value f33 and the first frequency fr1, the energy storage system 1 supplies power to the power grid 3 at the upper limit of the regulation ratio (i.e., the first output boundary value OL1). When the operating frequency of the power grid 3 is between the first frequency fr1 and the third frequency fr3, the energy storage system 1 supplies power to the power grid 3 at the first upper limit of the regulation ratio corresponding to the operating frequency.

Under the circumstance that the energy storage unit 11 is charged by the power grid 3, when the operating frequency of the power grid 3 is at the second frequency boundary value f32, although the energy storage system 1 may theoretically let the energy storage unit 11 be charged by the power grid 3 with the regulation ratio at the first input boundary value IL1, FIG. 9B shows that the efficiency of the energy storage system 1 at this regulation ratio is suboptimal. Therefore, in this embodiment, only when the operating frequency of the power grid 3 increases to the fourth frequency boundary value f34, the energy storage unit 11 is charged by the power grid 3 with the regulation ratio at the third operating ratio R33. As shown in FIG. 9B, the efficiency of the energy storage system 1 is higher at the third operating ratio R33 compared to the first input boundary value IL1, enabling the energy storage unit 11 to be charged by the power grid 3 more efficiently. Please refer to FIGS. 3, 9A and 9B. In an embodiment, under the circumstance that the energy storage unit 11 is in the high charge state, when the operating frequency of the power grid 3 increases from the fourth frequency boundary value f34 to the fourth frequency fr4, the efficiency of the second upper limit of the regulation ratio corresponding to the operating frequency may decrease as the operating frequency increases in certain segments (according to the curve in FIG. 9B between the regulation ratios at the third operating ratio R33, the fourth operating ratio R34, and the second input boundary value IL2). Thus, the energy storage system 1 needs to balance between the efficiency and the state of charge of the energy storage unit 11 to select a proper regulation ratio for receiving power from the power grid 3. For example, when the operating frequency of the power grid 3 is between the fourth frequency boundary value f34 and the fifth frequency boundary value f35, the energy storage system 1 adopts the regulation ratio at the third operating ratio R22 to charge the energy storage unit 11 by the power grid 3. Thereby, the energy storage system 1 receives power from the power grid 3 at an efficient and minimal rate to provide the power regulation for the power grid 3, and both the power regulation and the charging amount of the energy storage system 1 are taken into consideration to prevent the state of charge of the energy storage unit 11 from getting too high. When the operating frequency of the power grid 3 is between the fifth frequency boundary value f35 and the sixth frequency boundary value f36, as the operating frequency of the power grid 3 increases, the regulation ratio adopted by the energy storage system 1 decreases, and meanwhile the efficiency of the energy storage system 1 gradually increases. The corresponding efficiency curve is shown as the curve in the segment between the regulation ratios at the third operating ratio R33 and the fourth operating ratio R34 in FIG. 9B. The efficiency corresponding to the regulation ratio at the fourth operating ratio R34 is substantially optimal, and the efficiency starts to decrease when the regulation ratio is less than the fourth operating ratio R34. When the operating frequency of the power grid 3 is between the sixth frequency boundary value f36 and the fourth frequency fr4, the energy storage unit 11 is charged by the power grid 3 at the second upper limit of the regulation ratio since the regulation ratio of the energy storage system 1 must be less than or equal to the corresponding second upper limit. The corresponding efficiency curve is shown as the curve in the segment between the regulation ratios at the fourth operating ratio R34 and the second input boundary value IL2 in FIG. 9B.

In an embodiment, the selection of the fourth frequency boundary value f34 is based on the condition that the difference in efficiency between the energy storage system 1 operating at the third operating ratio R33 and at the first operating ratio R31 must be greater than the sixth efficiency threshold TH6. Namely, the fourth frequency boundary value f34 corresponding to the regulation ratio at the third operating ratio R33 is selected based on the condition that the efficiency of the energy storage system 1 operating with the regulation ratio at the third operating ratio R33 is greater than the efficiency of the energy storage system 1 operating with the regulation ratio at the first operating ratio R31 by the sixth efficiency threshold TH6. In another embodiment, when the operating frequency of the power grid 3 is between the second critical frequency fy and the predetermined supply frequency f0 (see FIG. 3), the regulation ratio of the power regulation provided by the energy storage system 1 is always at the first operating ratio R31. When the operating frequency of the power grid 3 increases to the second critical frequency fy, the energy storage system 1 must supply power to the power grid 3 at the regulation ratio less than or equal to zero. In this case, the energy storage system 1 selects the regulation ratio that provides the highest efficiency within the allowed range as the third operating ratio R33 to charge the energy storage unit 11 by the power grid 3.

Given that the state of charge of the energy storage unit 11 is high, the third frequency boundary value f33 may be set as close as possible to the second frequency boundary value f32 to expedite discharging the energy storage unit 11. In another embodiment, to decrease the stage of charge of the energy storage unit 11 as much as possible, when the operating frequency of the power grid 3 measured by the measurement unit 12 is greater than or equal to the first frequency boundary value f31 and less than or equal to the second frequency fr2, the control unit 13 configures the regulation ratio of the power regulation to equal the second operating ratio R32 or the first output boundary value OL1.

In another embodiment, similar to the embodiment of FIG. 4C, due to performance limitations, the need to protect the lifespan of the energy storage unit 11, or other design considerations, in the supply efficiency curve, the efficiency of the second operating ratio R32 and/or the second output boundary value OL2 may not be optimal. Similarly, in the charging efficiency curve, the efficiency of the third operating ratio R33, the fourth operating ratio R34 and/or the second input boundary value IL2 may not be optimal. However, it is noted that the regulation ratio of the energy storage system 1 supplying power to the power grid 3 jumps from the first operating ratio R31 to the second operating ratio R32 when the operating frequency of the power grid 3 decreases to the third frequency boundary value f33, and/or the regulation ratio of charging the energy storage unit 11 by the power grid 3 drops from the first operating ratio R31 to the third operating ratio R33 when the operating frequency of the power grid 3 increases to the fourth frequency boundary value f34. Thereby, the supply efficiency and/or the charging efficiency are improved to optimize the energy storage system, thus the lifespan of the energy storage unit 11 is extended and the energy losses is reduced.

Figure 10:
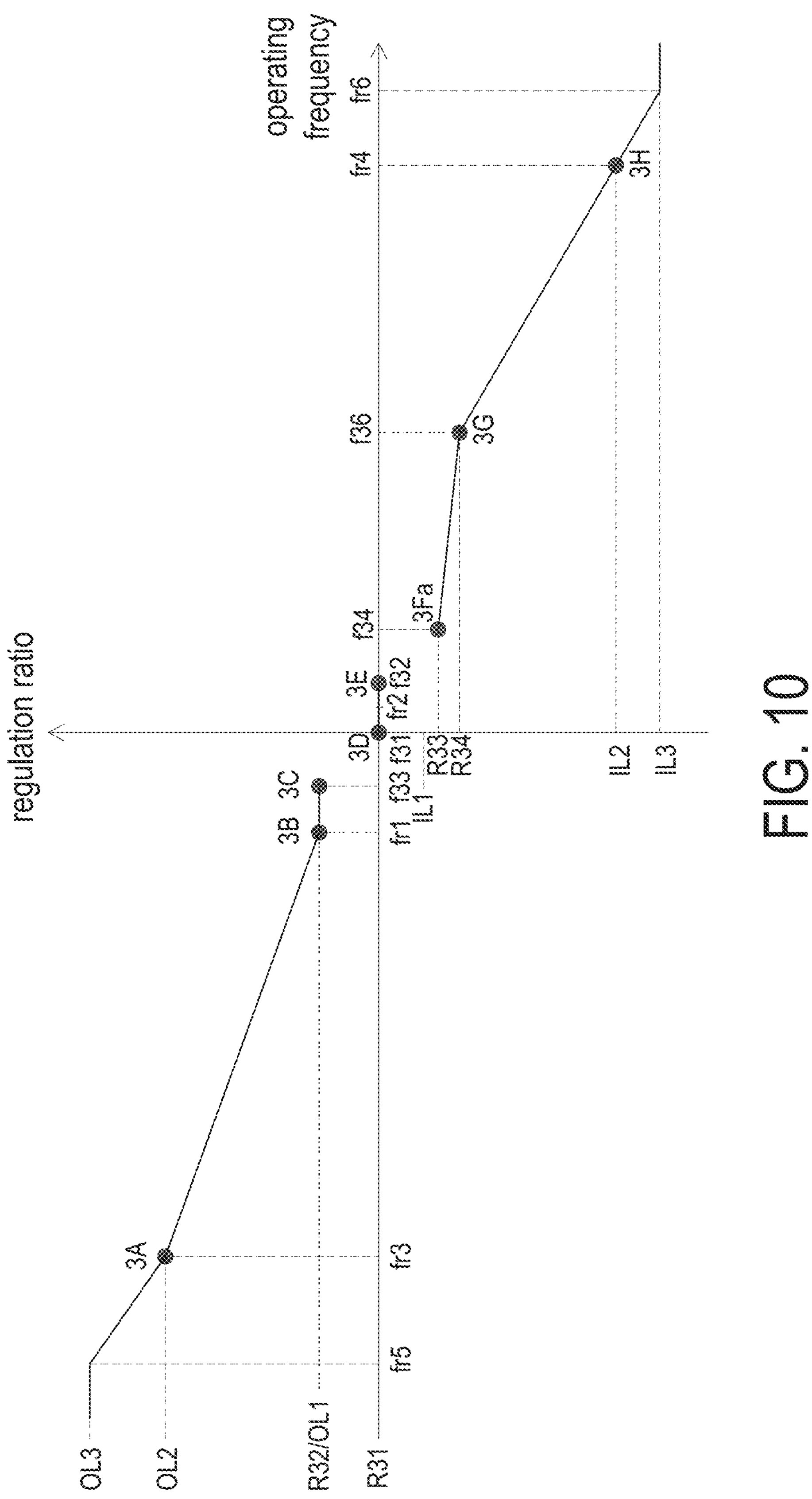
FIG. 10 is a schematic diagram illustrating another embodiment of the regulation ratio of the power regulation provided by the energy storage system corresponding to the operating frequency of the power grid when the energy storage unit is in the high charge state.

FIG. 10 is a schematic diagram illustrating another embodiment of the regulation ratio of the power regulation provided by the energy storage system 1 corresponding to the operating frequency of the power grid 3 when the energy storage unit 11 is in the high charge state. In FIG. 10, the operating points corresponding to those in FIG. 9A are designated by identical numeral references, and detailed descriptions thereof are omitted herein. In this embodiment, as shown in FIG. 10, when the operating frequency of the power grid 3 measured by the measurement unit 12 is greater than or equal to the fourth frequency boundary value f34 and less than or equal to the sixth frequency boundary value f36 (i.e., between the operating points 3Fa and 3G), the control unit 13 configures the regulation ratio of the power regulation to be less than or equal to the second upper limit corresponding to operating frequency at the fourth frequency boundary value f34 and greater than or equal to the second upper limit corresponding to the operating frequency at the sixth frequency boundary value f36. Further, the control unit 13 configures the regulation ratio of the power regulation to decrease or remain constant as the operating frequency increases (as illustrated in FIG. 10 with an example of decreasing with the increment of the operating frequency). In the segment between the operating points 3Fa and 3G, if the control unit 13 configures the regulation ratio of the power regulation to remain constant as the operating frequency increases, the energy storage system 1 receives power from the power grid 3 at an efficient and minimal rate to provide the power regulation for the power grid 3, and both the power regulation and the charging amount of the energy storage system 1 are taken into consideration to prevent the state of charge of the energy storage unit 11 from getting too high. Alternatively, if the control unit 13 configures the regulation ratio of the power regulation to decrease as the operating frequency increases, the efficiency of the energy storage system 1 may be improved.

In summary, the present disclosure provides an energy storage system and an operating method thereof which configure the regulation ratio of the power regulation provided by the energy storage system according to the state of charge of the energy storage unit in the energy storage system, the operating frequency of the power grid, and the efficiency of the energy storage system. Accordingly, the energy storage unit supplies power to the power grid or is charged by the power grid at the regulation ratio of the contracted capacity, which allows the energy storage system to operate with high efficiency.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An energy storage system, configured to provide power regulation for a power grid with a maximum value of the power regulation being a contracted capacity, wherein when an operating frequency of the power grid is greater than or equal to a first frequency and less than or equal to a second frequency, a regulation ratio of the power regulation of the energy storage system is greater than or equal to a first input boundary value and less than or equal to a first output boundary value;

when the operating frequency of the power grid is greater than or equal to a third frequency and less than or equal to the first frequency, the regulation ratio of the power regulation of the energy storage system is greater than or equal to the first input boundary value and less than or equal to a second output boundary value; when the operating frequency decreases from the first frequency to the third frequency, a plurality of first upper limits of the regulation ratio, which correspond to a plurality of first operating frequencies decreasing from the first frequency to the third frequency, increase from the first output boundary value to the second output boundary value correspondingly, and a plurality of first lower limits of the regulation ratio, which correspond to the plurality of first operating frequencies decreasing from the first frequency to the third frequency, increase from the first input boundary value to the second output boundary value correspondingly;

when the operating frequency of the power grid is greater than or equal to the second frequency and less than or equal to a fourth frequency, the regulation ratio of the power regulation of the energy storage system is greater than or equal to a second input boundary value and less than or equal to the first output boundary value; when the operating frequency increases from the second frequency to the fourth frequency, a plurality of second upper limits of the regulation ratio, which correspond to a plurality of second operating frequencies increasing from the second frequency to the fourth frequency, decrease from the first output boundary value to the second input boundary value correspondingly, and a plurality of second lower limits of the regulation ratio, which correspond to the plurality of second operating frequencies increasing from the second frequency to the fourth frequency, decrease from the first input boundary value to the second input boundary value correspondingly;

wherein the energy storage system comprises:

an energy storage unit, configured to store and provide power;

a measurement unit, configured to measure the operating frequency of the power grid; and a control unit, coupled to the measurement unit and the energy storage unit, and configured to receive the operating frequency of the power grid measured by the measurement unit;

wherein when a state of charge of the energy storage unit is greater than a first charge level, the energy storage unit is in a normal charge state;

when the state of charge of the energy storage unit is less than the first charge level, the energy storage unit is in a low charge state;

when the control unit configures the regulation ratio of the power regulation of the energy storage system to be greater than 0, the control unit configures the energy storage unit to supply the power to the power grid with the regulation ratio of the contracted capacity;

when the control unit configures the regulation ratio of the power regulation of the energy storage system to be less than 0, the control unit configures the energy storage unit to be charged by the power grid with the regulation ratio of the contracted capacity;

when the operating frequency of the power grid measured by the measurement unit is greater than or equal to a first frequency boundary value and less than or equal to a second frequency boundary value, the control unit configures the regulation ratio of the power regulation to be a first operating ratio, and the first operating ratio is less than or equal to 0 and greater than or equal to the first input boundary value; and the first frequency boundary value is less than the first frequency, and/or the second frequency boundary value is greater than the second frequency.

2. The energy storage system according to claim 1, wherein when the energy storage unit is in the normal charge state, the first frequency boundary value is less than the first frequency, and the second frequency boundary value is greater than the second frequency.

3. The energy storage system according to claim 1, wherein when the energy storage unit is in the low charge state, the first frequency boundary value is less than the first frequency.

4. The energy storage system according to claim 1, wherein when the state of charge of the energy storage unit is greater than a second charge level, the energy storage unit is in a high charge state; and when the energy storage unit is in the high charge state, the second frequency boundary value is greater than the second frequency.

5. The energy storage system according to claim 1, further comprising an auxiliary power supply device, wherein the control unit configures the first operating ratio to be less than 0, and an input power received by the energy storage system from the power grid is greater than or equal to an auxiliary power provided by the auxiliary power supply device.

6. The energy storage system according to claim 1, wherein when the operating frequency of the power grid measured by the measurement unit is greater than or equal to the third frequency and less than or equal to a third frequency boundary value, the control unit configures the regulation ratio of the power regulation to be less than or equal to the second output boundary value and greater than or equal to a second operating ratio;

the third frequency boundary value is less than the first frequency boundary value;

the second operating ratio is greater than the first operating ratio, and a second efficiency of the energy storage system supplying power to the power grid at the second operating ratio is greater than a first efficiency of the energy storage system supplying the power to the power grid at the first operating ratio by an efficiency threshold.

7. The energy storage system according to claim 1, wherein when the state of charge of the energy storage unit is greater than a second charge level, the energy storage unit is in a high charge state; when the energy storage unit is in the high charge state and the operating frequency of the power grid measured by the measurement unit is greater than or equal to the third frequency and less than or equal to a third frequency boundary value, the control unit configures the regulation ratio of the power regulation to be less than or equal to the second output boundary value and greater than or equal to a second operating ratio;

the third frequency boundary value is less than the first frequency boundary value, and the first frequency boundary value is less than or equal a predetermined supply frequency of the power grid;

the second operating ratio is greater than the first operating ratio, and a second efficiency of the energy storage system supplying power to the power grid at the second operating ratio is greater than a first efficiency of the energy storage system supplying the power to the power grid at the first operating ratio by an efficiency threshold.

8. The energy storage system according to claim 1, wherein when the operating frequency of the power grid measured by the measurement unit is greater than or equal to a third frequency boundary value and less than or equal to the fourth frequency, the control unit configures the regulation ratio of the power regulation to be less than or equal to a second operating ratio and greater than or equal to the second input boundary value;

the third frequency boundary value is greater than the second frequency boundary value;

the second operating ratio is less than the first operating ratio, and a second efficiency of charging the energy storage unit by the power grid at the second operating ratio is greater than a first efficiency of charging the energy storage unit by the power grid at the first operating ratio by an efficiency threshold.

9. The energy storage system according to claim 1, wherein when the energy storage unit is in the low charge state and the operating frequency of the power grid measured by the measurement unit is greater than or equal to a third frequency boundary value and less than or equal to the fourth frequency, the control unit configures the regulation ratio of the power regulation to be less than or equal to a second operating ratio and greater than or equal to the second input boundary value;

the third frequency boundary value is greater than the second frequency boundary value, and the second frequency boundary value is greater than or equal to a predetermined supply frequency of the power grid;

the second operating ratio is less than the first operating ratio, and a second efficiency of charging the energy storage unit by the power grid at the second operating ratio is greater than a first efficiency of charging the energy storage unit by the power grid at the first operating ratio by an efficiency threshold.

10. An operating method of an energy storage system, wherein the energy storage system is configured to provide power regulation for a power grid with a maximum value of the power regulation being a contracted capacity, when an operating frequency of the power grid is greater than or equal to a first frequency and less than or equal to a second frequency, a regulation ratio of the power regulation of the energy storage system is greater than or equal to a first input boundary value and less than or equal to a first output boundary value;

when the operating frequency of the power grid is greater than or equal to a third frequency and less than or equal to the first frequency, the regulation ratio of the power regulation of the energy storage system is greater than or equal to the first input boundary value and less than or equal to a second output boundary value; when the operating frequency decreases from the first frequency to the third frequency, a plurality of first upper limits of the regulation ratio, which correspond to a plurality of first operating frequencies decreasing from the first frequency to the third frequency, increase from the first output boundary value to the second output boundary value correspondingly, and a plurality of first lower limits of the regulation ratio, which correspond to the plurality of first operating frequencies decreasing from the first frequency to the third frequency, increase from the first input boundary value to the second output boundary value correspondingly;

when the operating frequency of the power grid is greater than or equal to the second frequency and less than or equal to a fourth frequency, the regulation ratio of the power regulation of the energy storage system is greater than or equal to a second input boundary value and less than or equal to the first output boundary value; when the operating frequency increases from the second frequency to the fourth frequency, a plurality of second upper limits of the regulation ratio, which correspond to a plurality of second operating frequencies increasing from the second frequency to the fourth frequency, decrease from the first output boundary value to the second input boundary value correspondingly, and a plurality of second lower limits of the regulation ratio, which correspond to the plurality of second operating frequencies increasing from the second frequency to the fourth frequency, decrease from the first input boundary value to the second input boundary value correspondingly;

wherein the energy storage system comprises an energy storage unit, a measurement unit and a control unit, the energy storage unit is configured to store and provide power, the measurement unit is configured to measure the operating frequency of the power grid, and the control unit is coupled to the measurement unit and the energy storage unit and is configured to receive the operating frequency of the power grid measured by the measurement unit; when a state of charge of the energy storage unit is greater than a first charge level, the energy storage unit is in a normal charge state; when the state of charge of the energy storage unit is less than the first charge level, the energy storage unit is in a low charge state; when the control unit configures the regulation ratio of the power regulation of the energy storage system to be greater than 0, the control unit configures the energy storage unit to supply the power to the power grid with the regulation ratio of the contracted capacity; when the control unit configures the regulation ratio of the power regulation of the energy storage system to be less than 0, the control unit configures the energy storage unit to be charged by the power grid with the regulation ratio of the contracted capacity;

wherein the operating method comprises:

when the operating frequency of the power grid measured by the measurement unit is greater than or equal to a first frequency boundary value and less than or equal to a second frequency boundary value, configuring the control unit to configure the regulation ratio of the power regulation to be a first operating ratio, wherein the first operating ratio is less than or equal to 0 and greater than or equal to the first input boundary value; wherein the first frequency boundary value is less than the first frequency, and/or the second frequency boundary value is greater than the second frequency.

11. The operating method according to claim 10, wherein when the energy storage unit is in the normal charge state, the first frequency boundary value is less than the first frequency, and the second frequency boundary value is greater than the second frequency.

12. The operating method according to claim 10, wherein when the energy storage unit is in the low charge state, the first frequency boundary value is less than the first frequency.

13. The operating method according to claim 10, wherein when the state of charge of the energy storage unit is greater than a second charge level, the energy storage unit is in a high charge state; and when the energy storage unit is in the high charge state, the second frequency boundary value is greater than the second frequency.

14. The operating method according to claim 10, wherein the energy storage system further comprises an auxiliary power supply device, and the operating method further comprises:

configuring the control unit to configure the first operating ratio to be less than 0, wherein an input power received by the energy storage system from the power grid is greater than or equal to an auxiliary power provided by the auxiliary power supply device.

15. The operating method according to claim 10, further comprising:

when the operating frequency of the power grid measured by the measurement unit is greater than or equal to the third frequency and less than or equal to a third frequency boundary value, configuring the control unit to configure the regulation ratio of the power regulation to be less than or equal to the second output boundary value and greater than or equal to a second operating ratio, wherein the third frequency boundary value is less than the first frequency boundary value;

the second operating ratio is greater than the first operating ratio, and a second efficiency of the energy storage system supplying power to the power grid at the second operating ratio is greater than a first efficiency of the energy storage system supplying the power to the power grid at the first operating ratio by an efficiency threshold.

16. The operating method according to claim 10, wherein when the state of charge of the energy storage unit is greater than a second charge level, the energy storage unit is in a high charge state, and the operating method further comprises:

when the energy storage unit is in the high charge state and the operating frequency of the power grid measured by the measurement unit is greater than or equal to the third frequency and less than or equal to a third frequency boundary value, configuring the control unit to configure the regulation ratio of the power regulation to be less than or equal to the second output boundary value and greater than or equal to a second operating ratio, wherein the third frequency boundary value is less than the first frequency boundary value, and the first frequency boundary value is less than or equal a predetermined supply frequency of the power grid;

the second operating ratio is greater than the first operating ratio, and a second efficiency of the energy storage system supplying power to the power grid at the second operating ratio is greater than a first efficiency of the energy storage system supplying the power to the power grid at the first operating ratio by an efficiency threshold.

17. The operating method according to claim 10, further comprising:

when the operating frequency of the power grid measured by the measurement unit is greater than or equal to a third frequency boundary value and less than or equal to the fourth frequency, configuring the control unit to configure the regulation ratio of the power regulation to be less than or equal to a second operating ratio and greater than or equal to the second input boundary value, wherein the third frequency boundary value is greater than the second frequency boundary value;

the second operating ratio is less than the first operating ratio, and a second efficiency of charging the energy storage unit by the power grid at the second operating ratio is greater than a first efficiency of charging the energy storage unit by the power grid at the first operating ratio by an efficiency threshold.

18. The operating method according to claim 10, further comprising:

when the energy storage unit is in the low charge state and the operating frequency of the power grid measured by the measurement unit is greater than or equal to a third frequency boundary value and less than or equal to the fourth frequency, configuring the control unit to configure the regulation ratio of the power regulation to be less than or equal to a second operating ratio and greater than or equal to the second input boundary value, wherein the third frequency boundary value is greater than the second frequency boundary value, and the second frequency boundary value is greater than or equal to a predetermined supply frequency of the power grid;

the second operating ratio is less than the first operating ratio, and a second efficiency of charging the energy storage unit by the power grid at the second operating ratio is greater than a first efficiency of charging the energy storage unit by the power grid at the first operating ratio by an efficiency threshold.

* * * * *